United States Patent
Yoshida et al.

(10) Patent No.: US 10,719,547 B2
(45) Date of Patent: Jul. 21, 2020

(54) IMAGE RETRIEVAL ASSIST DEVICE AND IMAGE RETRIEVAL ASSIST METHOD

(71) Applicant: Panasonic i-PRO Sensing Solutions Co., Ltd., Fukuoka (JP)

(72) Inventors: Hideyuki Yoshida, Fukuoka (JP); Mikio Morioka, Kanagawa (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 193 days.

(21) Appl. No.: 15/896,803

(22) Filed: Feb. 14, 2018

(65) Prior Publication Data
US 2019/0065497 A1    Feb. 28, 2019

(30) Foreign Application Priority Data

Aug. 24, 2017   (JP) .................................. 2017-161532

(51) Int. Cl.
| | |
|---|---|
| *G06F 16/487* | (2019.01) |
| *G09G 5/14* | (2006.01) |
| *G06F 16/78* | (2019.01) |
| *G06F 16/58* | (2019.01) |
| *G06F 16/787* | (2019.01) |

(52) U.S. Cl.
CPC ........ *G06F 16/487* (2019.01); *G06F 16/5866* (2019.01); *G06F 16/78* (2019.01); *G06F 16/787* (2019.01); *G09G 5/14* (2013.01)

(58) Field of Classification Search
None
See application file for complete search history.

(56) References Cited

U.S. PATENT DOCUMENTS

| | | | | |
|---|---|---|---|---|
| 6,466,260 | B1 * | 10/2002 | Hatae ................... | G08G 1/0175 348/149 |
| 9,489,839 | B2 * | 11/2016 | Nerayoff ............ | G06K 9/00624 |
| 10,102,586 | B1 * | 10/2018 | Marlow ................ | G06Q 40/08 |
| 2003/0081935 | A1 * | 5/2003 | Kirmuss ................. | H04N 7/18 386/327 |
| 2010/0245568 | A1 * | 9/2010 | Wike, Jr. ............. | G08G 1/0175 348/143 |
| 2013/0250106 | A1 * | 9/2013 | Chang .................. | G08G 1/0175 348/148 |
| 2015/0110466 | A1 * | 4/2015 | Chen ........................ | H04N 5/76 386/241 |
| 2016/0337636 | A1 * | 11/2016 | Wollard .................. | G06T 19/00 |

FOREIGN PATENT DOCUMENTS

JP    2007-174016 A    7/2007

* cited by examiner

*Primary Examiner* — Iman K Kholdebarin
(74) *Attorney, Agent, or Firm* — Seed IP Law Group LLP

(57) ABSTRACT

An image retrieval assist device that is communicably connected to an investigation assist device for recording captured images of cameras installed at a plurality of intersections respectively in correlation with camera information and intersection information. The image retrieval assist device has a processor, a communication unit; and a storage that stores an extraction condition of an image for each type of event that has occurred at the intersection, the image indicating a situation at a time of occurrence of the event. The processor accepts an input of event information including the type of event. The processor generates an image retrieval key including the extraction condition according to the input event information. The communication unit transmits the generated image retrieval key to the investigation assist device.

16 Claims, 20 Drawing Sheets

FIG. 7B

| | | TP1 |
|---|---|---|
| | | SIGNAL IGNORING |
| TP1 | TIME | FROM ONE MINUTE BEFORE INCIDENT OCCURRENCE TO ONE MINUTE AFTER INCIDENT OCCURRENCE |
| | PLACE | CAMERA CORRESPONDING TO INTERSECTION ID OF INTERSECTION AT WHICH INCIDENT HAS OCCURRED |
| | NECESSARY IMAGE | CAPTURED IMAGE (FRONT IMAGE OF VEHICLE) OF CAMERA CAPTURING VEHICLE IN DIRECTION OPPOSITE TO TRAVELING DIRECTION |
| | | TRAFFIC ACCIDENT |
| TP2 | TIME | EVERY ONE MINUTE FROM ONE MINUTE BEFORE INCIDENT OCCURRENCE TO TEN MINUTES AFTER INCIDENT OCCURRENCE |
| | PLACE | CAMERA CORRESPONDING TO INTERSECTION ID OF INTERSECTION AT WHICH INCIDENT HAS OCCURRED |
| | NECESSARY IMAGE | CAPTURED IMAGES OF CAMERAS IN ALL DIRECTIONS |
| | | DRINK-DRIVING |
| TP3 | TIME | TIME OF INCIDENT OCCURRENCE, TIME AT WHICH VEHICLE IS LIKELY STAYING AT IMMEDIATELY PRECEDING INTERSECTION (=TIME OF INCIDENT OCCURRENCE − MOVING TIME) |
| | PLACE | CAMERA CORRESPONDING TO INTERSECTION ID OF INTERSECTION AT WHICH INCIDENT HAS OCCURRED, CAMERA CORRESPONDING TO INTERSECTION ID OF INTERSECTION AT WHICH VEHICLE IS LIKELY STAYING IMMEDIATELY BEFORE |
| | NECESSARY IMAGE | CAPTURED IMAGE (FRONT IMAGE OF VEHICLE) OF CAMERA CAPTURING VEHICLE FOR NECESSARY IMAGE IN DIRECTION OPPOSITE TO TRAVELING DIRECTION |

TEP

FIG. 7C

| TIME | AUGUST 10, 2017, 17:05 TO AUGUST 10, 2017, 17:07 | ⎫ |
|---|---|---|
| PLACE | CAMERA INSTALLED IN INTERSECTION ID (AX90119) | ⎬ SCHK1 |
| NECESSARY IMAGE | FRONT IMAGE OF VEHICLE INDICATING VEHICLE LICENSE NUMBER (JJJ-5403) | ⎭ |

SIGNAL IGNORING

FIG. 7D

| | TRAFFIC ACCIDENT | |
|---|---|---|
| TIME | EVERY ONE MINUTE FROM AUGUST 12, 2017, 9:55 TO AUGUST 12, 2017, 10:06 | ⎫ |
| PLACE | CAMERA INSTALLED IN INTERSECTION ID (BF58203) | ⎬ SCHK2 |
| NECESSARY IMAGE | CAPTURED IMAGES OF FOUR ALL CAMERAS | ⎭ |

| | DRINK-DRIVING | |
|---|---|---|
| TIME | AUGUST 7, 2017, 19:53 AND 19:48 | ⎫ |
| PLACE | CAMERAS INSTALLED IN INTERSECTION ID (GV15307) AND INTERSECTION ID (GV15306) | ⎬ SCHK3 |
| NECESSARY IMAGE | FRONT IMAGE OF VEHICLE INDICATING VEHICLE LICENSE NUMBER (GMR-4987) | ⎭ |

IMAGE RETRIEVAL ASSIST DEVICE AND IMAGE RETRIEVAL ASSIST METHOD

BACKGROUND OF THE INVENTION

1. Field of the Invention

The present disclosure relates to an image retrieval assist device and an image retrieval assist method which assist retrieval of a captured image of a camera indicating a situation at the time of occurrence of incidents or accidents, for example.

2. Description of the Related Art

In the related art, a technique is known in which a plurality of cameras are disposed at predetermined locations on a traveling route of a vehicle, and camera image information captured by the respective cameras is displayed on a display device in a terminal device mounted in the vehicle through a network and wireless information exchange device (for example, refer to JP-A-2007-174016). According to JP-A-2007-174016, a user can obtain a real-time camera image with a large information amount, based on the camera image information captured by the plurality of cameras disposed on the traveling route of the vehicle.

In JP-A-2007-174016, the camera image information captured by the plurality of cameras is displayed on the display device in the terminal device mounted on the vehicle. Therefore, the user (for example, driver) can check real-time captured images at the locations where the respective cameras are disposed. In JP-A-2007-174016, however, a technique is not considered which assists retrieval of an image suitable for the situation at the time of the occurrence of incident or accident, as an image to be posted on the report created with the end of the incident or accident that has occurred at the intersection at which many people or vehicles come and go. For this reason, even in the case of using the technique disclosed in JP-A-2007-174016 when the policeman creates a report with the end of the above-described accident or incident, the policeman can hardly extract an image suitable for indicating the situation at the time of the occurrence of the incident or accident, a lot of time and labor are necessary for creation of a report, and the work burden on the policeman is hardly reduced.

The disclosure has been made in view of the above-described circumstances and an object thereof is to provide an image retrieval assist device and an image retrieval assist method which, when a policeman creates a report with the end of an incident or accident that has occurred at an intersection at which many people or vehicles come and go, assists efficiently retrieval of an image suitable for indicating the situation at the time of the occurrence of the incident or accident and reduces the work burden on the policeman.

SUMMARY OF THE INVENTION

The present disclosure provides an image retrieval assist device that is communicably connected to an investigation assist device for recording captured images of cameras installed at a plurality of intersections respectively in correlation with camera information and intersection information. The image retrieval assist device has a processor, a communication unit; and a storage that stores an extraction condition of an image for each type of event that has occurred at the intersection, the image indicating a situation at a time of occurrence of the event. The processor accepts an input of event information including the type of event. The processor generates an image retrieval key including the extraction condition according to the input event information. The communication unit transmits the generated image retrieval key to the investigation assist device.

Furthermore the present disclosure provides an image retrieval assist method using an image retrieval assist device that is communicably connected to an investigation assist device for recording captured images of cameras installed at a plurality of intersections respectively in correlation with camera information and intersection information. The image retrieval assist method includes storing an extraction condition of an image in a storage for each type of event that has occurred at the intersection. The image indicates a situation at a time of occurrence of the event. The image retrieval assist method includes accepting an input of event information including the type of event. The image retrieval assist method includes generating an image retrieval key including the extraction condition of the image indicating the situation at the time of the occurrence of the event according to the input event information. The image retrieval assist method includes transmitting the generated image retrieval key to the investigation assist device.

According to the disclosure, it is possible to efficiently assist the retrieval of the image suitable for indicating the situation at the time of the incident or accident occurrence to reduce the work burden on the policeman when the policeman creates the report with the end of the incident or accident that has occurred at the intersection where many people and vehicles come and go.

BRIEF DESCRIPTION OF THE DRAWINGS

FIG. 7B is a diagram illustrating an example of a report template corresponding to the type of incident or accident;

FIG. 7C is a diagram illustrating an example of an image retrieval key for image retrieval relating to a signal ignoring;

FIG. 7D is a diagram illustrating an example of an image retrieval key for image retrieval relating to a traffic accident;

DETAILED DESCRIPTION OF THE PREFERRED EMBODIMENTS

Background to First Embodiment

In JP-A-2007-174016 described above, the camera image information captured by the plurality of cameras is displayed on the display device in the terminal device mounted on the vehicle. Therefore, the user (for example, driver) can check real-time captured images at the locations where the respective cameras are disposed. In JP-A-2007-174016, however, a technique is not considered which assists retrieval of an image suitable for the situation at the time of the occurrence of incident or accident, as an image to be posted on the report created with the end of the incident or accident that has occurred at the intersection at which many people or vehicles come and go. For this reason, even in the case of using the technique disclosed in JP-A-2007-174016 when the policeman creates a report with the end of the above-described accident or incident, the policeman can hardly extract an image suitable for indicating the situation at the time of the occurrence of the incident or accident, a lot of time and labor are necessary for creation of a report, and the work burden on the policeman is hardly reduced.

Therefore, in view of the above-described circumstances, an example of an image retrieval assist device and an image retrieval assist method is described in the following first embodiment in which, when a policeman creates a report with the end of an incident or accident that has occurred at an intersection at which many people or vehicles come and go, assists efficiently retrieval of an image suitable for indicating the situation at the time of the occurrence of the incident or accident and reduces the work burden on the policeman.

Hereinafter, embodiments will be described in detail in which an image retrieval assist device, an image retrieval assist method, an image supplementing device, an image supplementing method, an image selecting device, an image selecting method, an image generating device, and an image generating method, with reference to the accompanying drawings. However, more detailed descriptions than needed may be omitted. For example, the detailed descriptions of known elements or the duplicated descriptions of substantially the same components may be omitted. This is in order to not only avoid unnecessary redundancy of the following descriptions, but also promote understanding of those skilled in the art. The accompanying drawings and the following descriptions are provided to make a person skilled in the art to understand the present disclosure, and the subjects of descriptions in claims are not limited by the drawings and descriptions.

In the following embodiments, a use case, which assists acquisition an image to be posted on a report when a policeman creates a report (crime report) with the end of an event such as an incident or accident which has occurred at an intersection where many people or vehicles come and go intersection or a periphery thereof, will be exemplified.

First Embodiment

Figure 1:
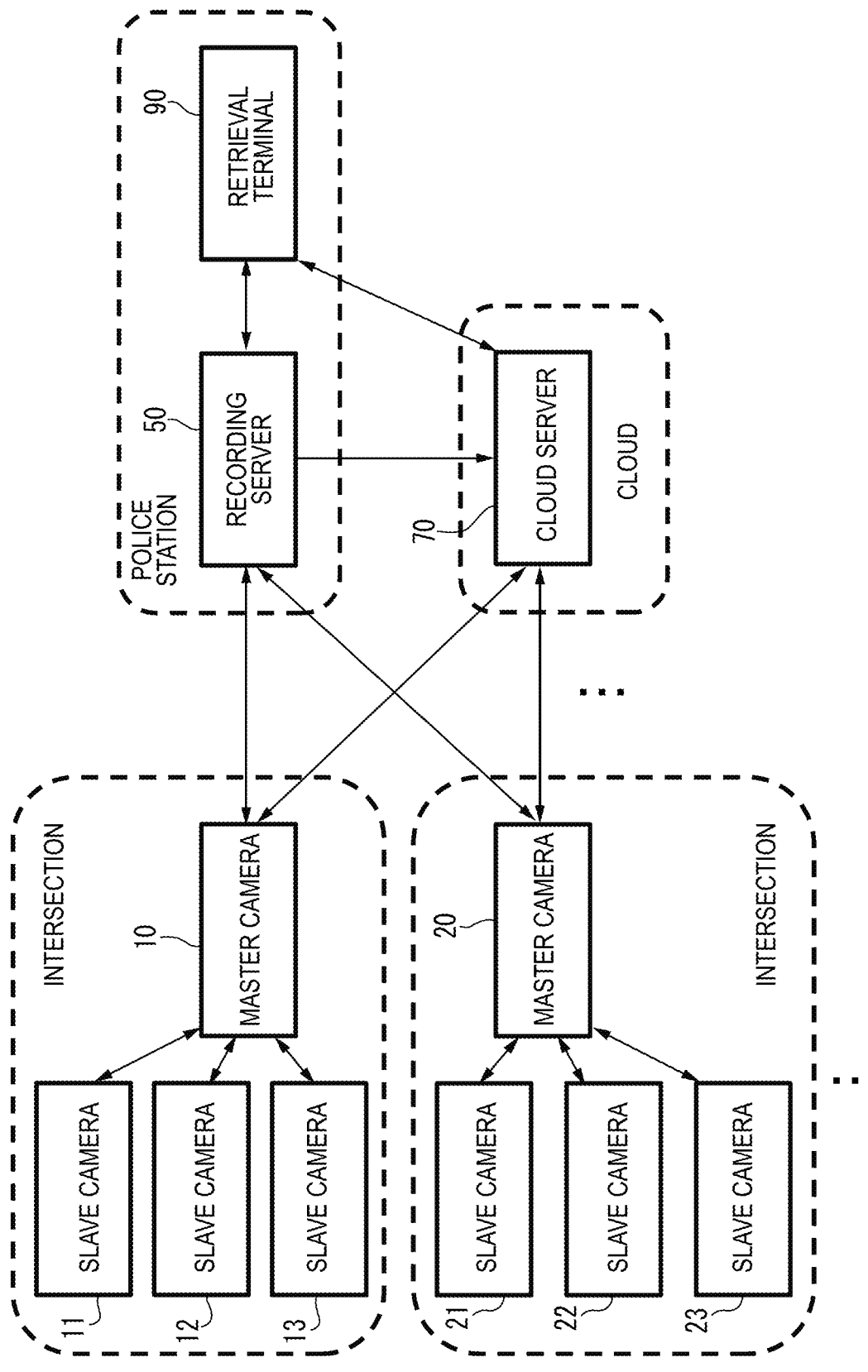
FIG. 1 is a block diagram illustrating a configuration example of a report creation assist system according to embodiments.
Figure 2A:
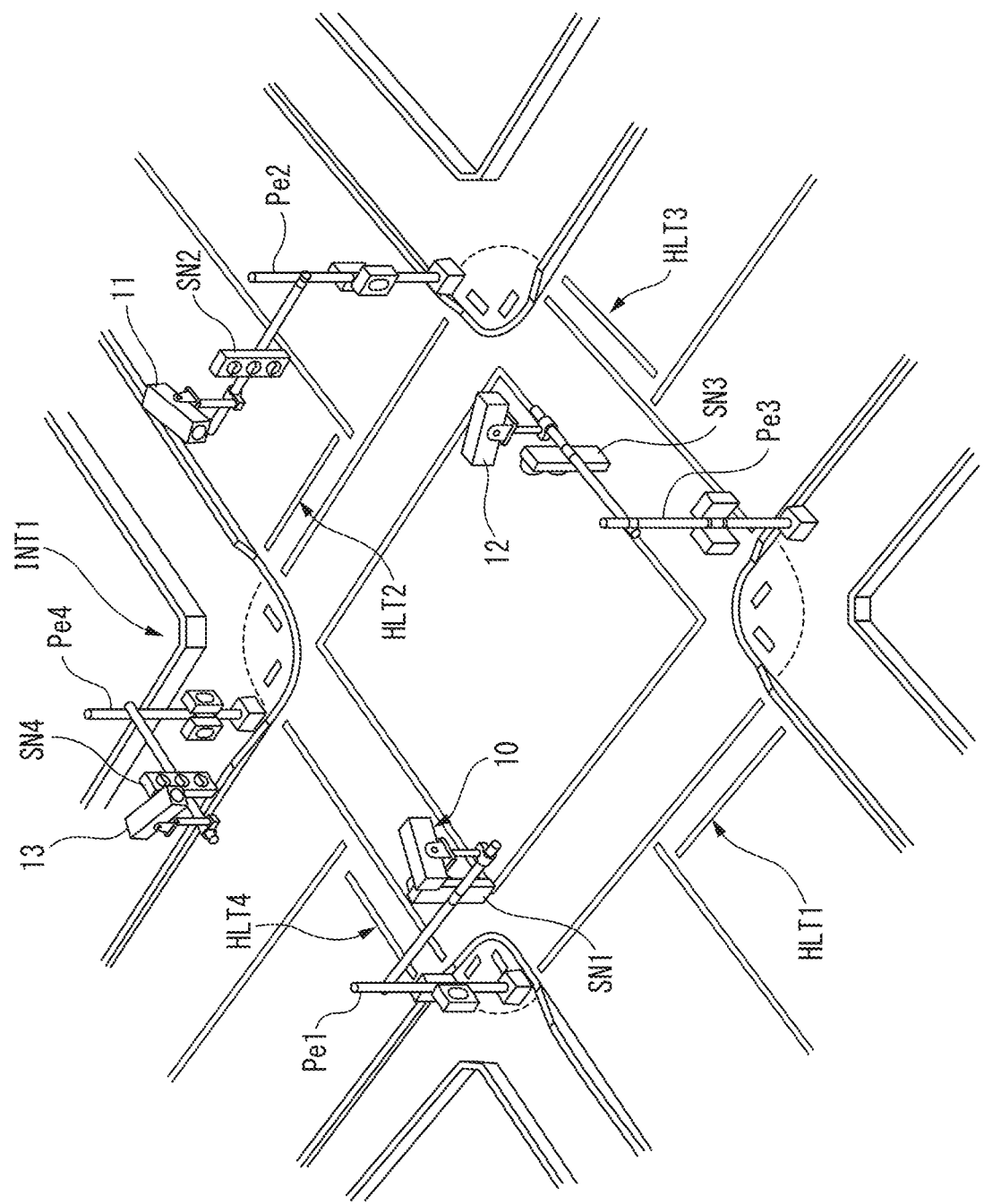
FIG. 2A is a view illustrating an example of an installation layout of a plurality of cameras at intersections.
Figure 2B:
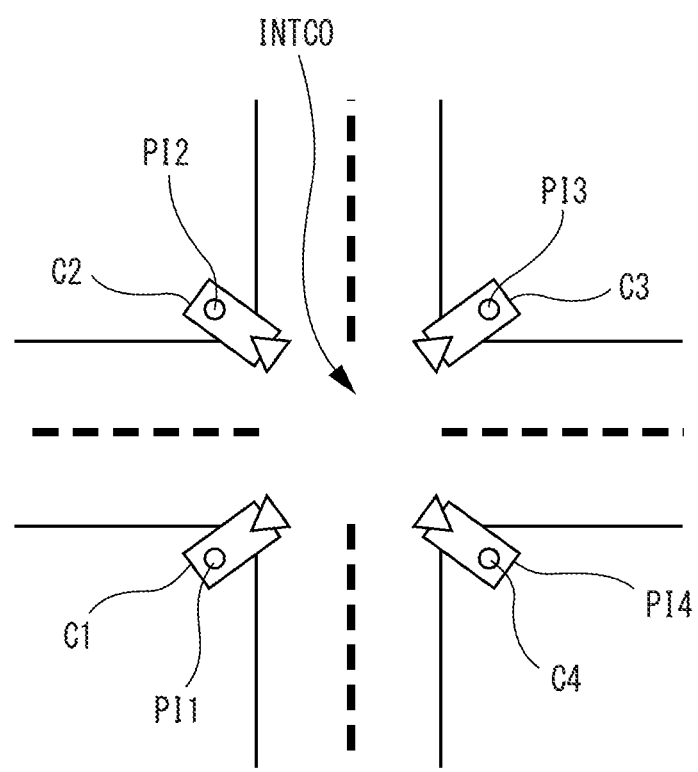
FIG. 2B is a view illustrating the other example of an installation layout of a plurality of cameras at intersections.

FIG. 1 is a block diagram illustrating a configuration example of a report creation assist system 100 according to embodiments. FIG. 2A is a view illustrating an example of an installation layout of a plurality of cameras at an intersection INT1. FIG. 2B is a view illustrating the other example of an installation layout of a plurality of cameras at an intersection INTC0. The report creation assist system 100 includes a plurality of cameras installed at each intersection, a recording server 50 and a retrieval terminal 90 installed in a police station, and a cloud server 70 present on the cloud.

In the report creation assist system 100, a plurality of cameras (for example, cameras 10 to 13) constitute one segment and are installed at each intersection. In the plurality of cameras in one segment, any one camera (for example, the camera 10) serves as a master camera, and the other cameras (for example, the cameras 11 to 13) serve as slave cameras. The master camera can communicate with the plurality of slave cameras connected to the master camera, and communicate with the recording server 50 or the cloud server 70. The slave cameras can communicate with the master camera connected to the slave cameras. FIG. 1 illustrates that the plurality of cameras are installed at the intersection (one segment), but only one master camera may be installed. Furthermore, only a plurality of master cameras may be installed at the intersection without slave cameras.

The cameras 11 to 13 and 21 to 23 serving as slave cameras are monitoring cameras which can capture subjects at view angles which were respectively set when the cameras were installed (for example, videos showing the situations at the intersections), and transmit the captured videos to the cameras 10 and 20 serving the master cameras. Each of the captured videos may include not only data of the captured video, but also identification information of the camera having captured the video (an example of camera information), and the same applies hereafter.

The cameras 10 and 20 serving as the master cameras receive the captured videos transmitted by the cameras 11 to 13 and 21 to 23 serving as the slave cameras connected to the cameras, respectively. The cameras 10 and 20 are monitoring cameras which can capture subjects at view angles set when the master cameras were installed (for example, videos showing the situations at the intersections). The cameras 10 and 20 correlate the captured videos thereof with the captured videos transmitted from the slave cameras, and transmit the videos to the recording server 50 or the cloud server 70.

The cameras 10 to 13 are installed to capture the intersection INT1 as illustrated in FIG. 2A. The cameras 10 and 11 are installed to substantially face each other. Similarly, the cameras 12 and 13 are installed to substantially face each other.

The camera 10 is installed on a assist bar mounted perpendicular to a pole Pe1 erected in the vertical direction, and disposed adjacent to a traffic signal SN1. The center of the view angle of the camera 10 is set to the central portion of the intersection INT1, and a stop line HLT2 around the central portion of the intersection INT1 and a predetermined area around the stop line HLT2 are included in the view angle. Therefore, the camera 10 can capture videos of subjects within the set view angle.

The camera 11 is installed on a assist bar mounted perpendicular to a pole Pe2 erected in the vertical direction, and disposed adjacent to a traffic signal SN2. The center of the view angle of the camera 11 is set to the central portion of the intersection INT1, and a stop line HLT1 around the central portion of the intersection INT1 and a predetermined area around the stop line HLT1 are included in the view angle of the camera 11. Therefore, the camera 11 can capture videos of subjects within the set view angle.

The camera 12 is installed on a assist bar mounted perpendicular to a pole Pe3 erected in the vertical direction, and disposed adjacent to a traffic signal SN3. The center of the view angle of the camera 12 is set to the central portion of the intersection INT1, and a stop line HLT4 around the central portion of intersection INT1 and a predetermined area around the stop line HLT4 are included in the view angle of the camera 12. Therefore, the camera 12 can capture videos of subjects within the set view angle.

The camera 13 is installed on a assist bar mounted perpendicular to a pole Pe4 erected in the vertical direction, and disposed adjacent to a traffic signal SN4. The center of the view angle of the camera 13 is set to the central portion of the intersection INT1, and a stop line HLT3 around the central portion of the intersection INT1 and a predetermined area around the stop line HLT3 are included in the view angle of the camera 13. Therefore, the camera 13 can capture videos of subjects within the set view angle.

The cameras 20 to 23 illustrated in FIG. 1 may also be installed at an intersection in the same manner as the cameras 10 to 13. The cameras 10 to 13 and 20 to 23 are not limited to the installation layout illustrated in FIG. 2A. For example, as illustrated in FIG. 2B, each of the cameras may be installed in such a manner that the optical axis of the lens thereof faces the optical axis of the lens of the corresponding camera installed in the diagonal direction. Although described later in detail, the installation layout illustrated in FIG. 2B shows that the cameras are installed at end areas of sidewalks which lead to an intersection INTC0, and mounted on poles P11 to P14 erected in the vertical direction with respect to the ground surface.

As illustrated in FIG. 2B, the cameras C1 and C3 are installed to face each other across the intersection INTC0, and the cameras C2 and C4 are installed to face each other with the intersection INTC0 interposed therebetween. The cameras C1 to C4 are fixedly installed on poles P11 to P14 on which traffic signals are respectively installed.

Figure 4:
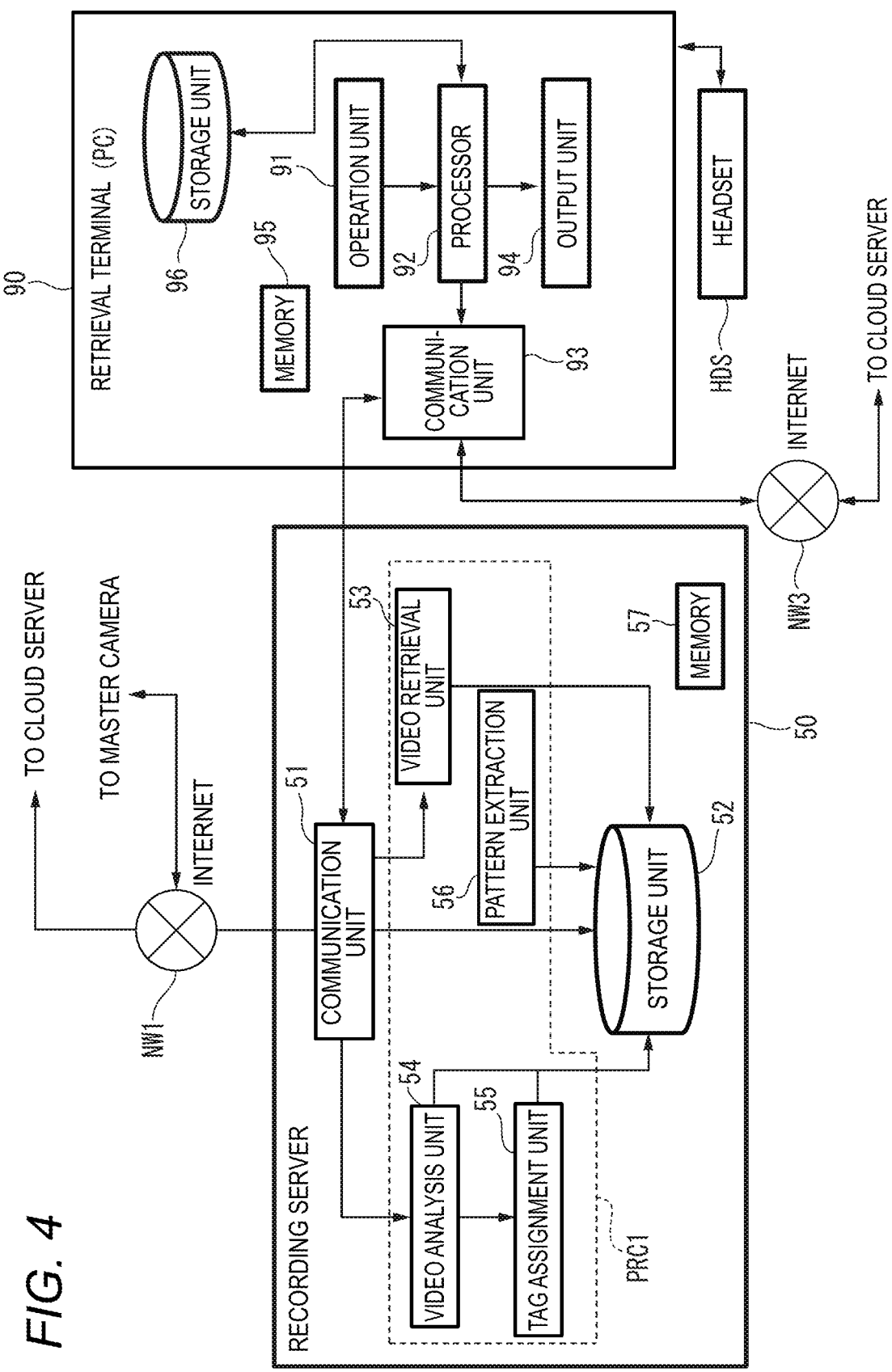
FIG. 4 is a block diagram illustrating an example of internal configurations of a recording server and a retrieval terminal according to embodiments.

The recording server 50 (an example of the investigation assist device) is installed in a police station, receives captured videos transmitted from cameras installed at intersections under the jurisdiction of the police station (for example, master cameras), and stores the received videos in a storage unit 52 (refer to FIG. 4). The stored videos are analyzed by the recording server 50 based on a request (instruction) from a retrieval terminal 90, when an event such as an incident or accident occurred, and used for acquiring detailed information on the incident or accident. The recording server 50 may transmit (upload) a part of the captured videos to the cloud server 70 in order to back up the captured videos. The part of the captured videos may include captured videos designated by an operation of a terminal (not illustrated) used by a manager, for example, captured videos for an important or serious event. The recording server 50 analyzes the received videos, acquires tag information, correlates the acquired tag information with the analyzed videos, and stores the resultant videos in the storage unit 52. The tag information may indicate information on the face of a person and the type or color of a vehicle in the captured videos. The recording server 50 may detect an occurrence of an event such as an incident or accident at or around the intersection through the analysis of the captured videos.

The retrieval terminal 90 (an example of an image retrieval assist device, an image supplementing device, an image selecting device, and an image generating device) is installed in the police station, and used by an official in the police station (that is, a policeman who is a user of the retrieval terminal 90). For example, the retrieval terminal 90 may include a laptop or notebook PC (Personal Computer). When an incident or accident occurred, the policeman receives a call (incoming call) from a person (reporter) who reported the occurrence of the incident or accident to the police station, makes an inquiry about detailed information on the incident or accident from the reporter, and correctly records various pieces of information acquired through the inquiry as data. The retrieval terminal 90 is not limited to the above-described PC, but may include a computer with a communication function, such as a smart phone, tablet terminal and PDA (Personal Digital Assistant). The retrieval terminal 90 requests (instructs) the recording server 50 or the cloud server 70 to retrieve or analyze the captured videos stored in the recording server 50 or the cloud server 70, and displays the retrieval result or analysis result on an output unit 94 (refer to FIG. 4).

The cloud server 70 is provided on a network such as a cloud, receives captured videos transmitted from the recording server 50 or cameras installed at intersections under the jurisdiction of police stations (specifically, master cameras), and stores the received videos in the storage unit 72 (refer to FIG. 4). The stored captured videos are analyzed by the cloud server 70 based on a request (instruction) from the retrieval terminal 90 when an event such as an incident or accident occurred, and used for acquiring detailed information on the incident or accident. The cloud server 70 analyzes the received videos, acquires tag information, correlates the acquired tag information with the analyzed videos, and stores the resultant videos in the storage unit 72. The tag information may indicate information on the faces of people and the types or colors of vehicles in the captured videos. The cloud server 70 may detect an occurrence of an event such as an incident or accident at or around an intersection through the analysis of the captured videos.

FIG. 1 illustrates that only one recording server 50 and one retrieval terminal 90 are provided in the police station, but a plurality of recording servers 50 and retrieval terminals 90 may be provided. Moreover, a plurality of police stations may be included in the report creation assist system 100.

Similarly, FIG. 1 illustrates that only one cloud server 70 is provided on the cloud, but a plurality of cloud servers may be provided.

Figure 3:
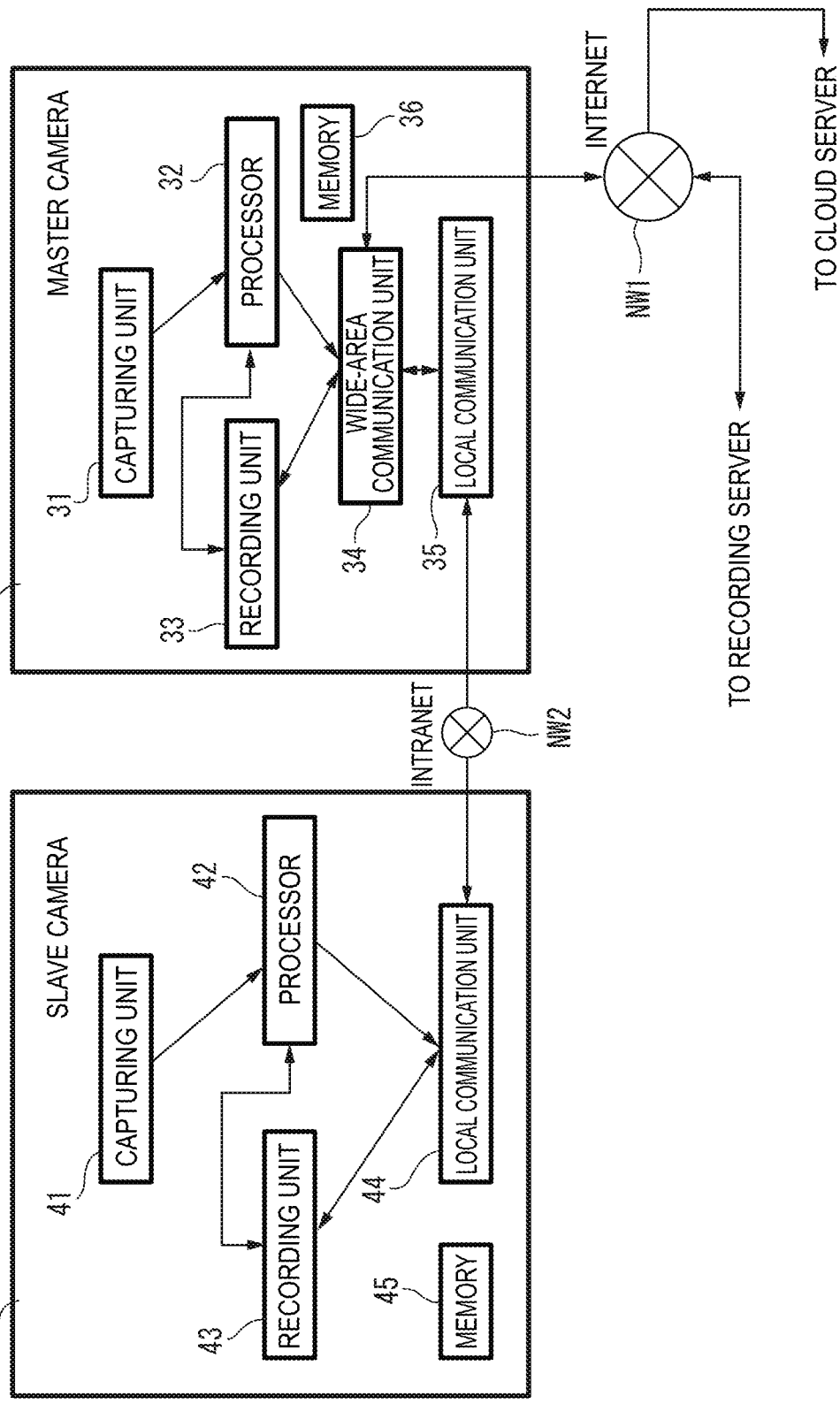
FIG. 3 is a block diagram illustrating an example of internal configurations of a master camera and a slave camera according to embodiments.

FIG. 3 is a block diagram illustrating internal configurations of the master camera and the slave camera according to embodiments. The cameras 11 to 13 corresponding to the slave cameras and the camera 10 corresponding to the master camera may be connected through a wired LAN (Local Area Network) such as an Intranet NW2, and connected through a local wireless network (for example, a wireless LAN or WiGig (registered trademark)).

Each of the cameras 11 to 13 and 21 to 23 corresponding to the slave cameras includes a capturing unit 41, a processor 42, a recording unit 43 and a local communication unit 44. In order to simplify the descriptions of the slave cameras, the camera 11 will be representatively exemplified. In FIG. 3, however, the camera 11 may be replaced with any one of the cameras 12, 13, 21, 22 and 23.

The capturing unit 41 includes an imaging lens and a solid state imaging device such as a CCD (Charge Coupled Device) image sensor or CMOS (Complementary Metal Oxide Semiconductor) image sensor. The capturing unit 41 outputs data of a captured video for subjects to the processor 42 at all times while the camera 11 is powered on, the captured video being acquired through a capturing operation of the solid state imaging device. The capturing unit 41 may include a pan tilt zoom mechanism for changing the capturing direction or zoom magnification of the camera.

The processor 42 is configured using a CPU (Central Processing Unit), MPU (Micro Processing Unit), DSP (Digital Signal Processor) or FPGA (Field-Programmable Gate Array).

The processor 42 functions as a control unit of the camera 11, and performs a control process for controlling overall operations of the respective units of the camera 11, a data input/output process among the respective units of the camera 11, a data calculation process and a data storage process. The processor 42 operates according to a program and data stored in the memory 45. The processor 42 uses the memory 45 during operation, acquires the current time information, and records (stores) the data of the video captured by the capturing unit 41 in the recording unit 43. Although not illustrated in FIG. 3, the camera 11 may include a GPS (Global Positioning System) receiver. In this case, the camera 11 may acquire the current position information from the GPS receiver, correlate the data of the captured video with the position information, and record the resultant data.

The GPS receiver will be briefly described. The GPS receiver receives satellite signals from a plurality of GPS signal transmitters (for examples, four navigation satellites), the satellite signals including the signal transmission times and position coordinates of the GPS signal transmitters. The GPS receiver calculates the current position coordinate of the master camera or slave camera based on the plurality of satellite signals and the reception times of the satellite signals. The calculation may be not performed by the GPS receiver, but performed by the processor 32 or 42 to which an output of the GPS receiver is input. The reception time information may be used for correcting the system time of the master camera or slave camera. The system time is used for recording the capturing times of images constituting a captured video, for example.

The processor 42 may control the capturing condition of the capturing unit 41 according to a control command from outside, received by the local communication unit 44. For example, when the control command from outside commands the processor to change a capturing direction, the processor 42 changes the capturing direction during a capturing operation of the capturing unit 41, according to the control command. For example, when the control command from outside commands the processor 42 to change the zoom magnification, the processor 42 changes the zoom magnification during a capturing operation of the capturing unit 41, according to the control command. For example, when the control command from outside commands the processor 42 to perform a tracking process for the designated subject, the processor 42 tracks the designated subject using the captured video data recorded in the recording unit 43, according to the control command. When various kinds of control commands are acquired by the processor 42, the processor 42 may perform processes corresponding to the respective control commands.

The processor 42 repeatedly transmits the captured video data recorded in the recording unit 43 to the master camera (for example, the camera 10) through the local communication unit 44. The repeated transmission is not limited to transmitting data whenever a predetermined period of time elapses, but may include transmitting data whenever an irregular time interval elapses, and transmitting data over a plurality of times. Hereafter, the same applies.

The recording unit 43 may include a semiconductor memory added in the camera 11 (for example, flash memory) or an external memory medium such as a memory card (for example, SD card), which is not added in the camera 11. The recording unit 43 correlates the data of the captured video generated by the processor 42 with the identification information of the camera 11 (an example of camera information) or the date and time information during capturing, and records the resultant data. The recording unit 43 normally pre-buffers and stores data of a video captured for a predetermined time, and continuously stores data of a video captured for a predetermined time (for example, 30 seconds) before the current time. When the recording unit 43 is configured as a memory card, the recording unit 43 may be freely inserted into and removed from the casing of the camera 11.

The local communication unit 44 is configured using a communication circuit. The local communication unit 44 transmits the data of the captured video recorded in the recording unit 43 to the master camera (for example, the camera 10), based on an instruction of the processor 42, through short range wireless communication.

The memory 45 is configured using a RAM (Random Access Memory) and ROM (Read Only Memory), for example, and temporarily stores a program or data required for performing an operation of the camera 11 and information or data generated during the operation of the camera 11. The RAM is a work memory used during an operation of the processor 42, for example. The ROM stores a program and data for controlling the processor 42 in advance. The memory 45 stores identification information for identifying the camera 11 (for example, serial number) and various pieces of setting information.

The camera 10 corresponding to the master camera includes a capturing unit 31, a processor 32, a recording unit 33, a wide-area communication unit 34, a local communication unit 35 and a memory 36. In order to simplify the descriptions of the master cameras, the camera 10 will be representatively exemplified. In FIG. 3, however, the camera 10 may be replaced with the camera 20.

The capturing unit 31 includes an imaging lens and a solid state imaging device such as a CCD image sensor or CMOS image sensor. The capturing unit 31 outputs data of a captured video of subjects to the processor 32 at all times while the camera 10 is powered on, the captured video being acquired through a capturing operation by the solid state imaging device. The capturing unit 31 may include a pan tilt zoom mechanism for changing the capturing direction or zoom magnification of the camera.

The processor 32 is configured using a CPU, MPU, DSP or FPGA, for example. The processor 32 functions as a control unit of the camera 10, and performs a control process for controlling overall operations of the respective units of the camera 10, a data input/output process among the respective units of the camera 10, a data calculation process and a data storage process. The processor 32 operates according to a program and data stored in the memory 36. The processor 32 uses the memory 36 during operation, acquires the current time information, or records data of a video captured by the capturing unit 31 or data of captured videos transmitted from the slave cameras (for example, cameras 11 to 13) into the recording unit 33. Although not illustrated in FIG. 3, the camera 10 may have a GPS receiver. In this case, the camera 10 may acquire the current position information from the GPS receiver.

The processor 32 may control the capturing condition of the capturing unit 31 according to a control command from outside, received by the local communication unit 35. For example, when the control command from outside commands the processor 32 to change a capturing direction, the processor 32 changes the capturing direction during a capturing operation of the capturing unit 31, according to the control command. For example, when the control command from outside commands the processor 32 to change the zoom magnification, the processor 32 changes the zoom magnification during a capturing operation of the capturing unit 31, according to the control command. For example, when the control command from outside commands the processor to perform a tracking process for a designated subject, the processor 32 tracks the designated subject using the captured video data recorded in the recording unit 33, according to the control command. When various kinds of control commands are acquired by the processor 32, the processor 32 may perform processes corresponding to the respective control commands.

The processor 32 repeatedly transmits the captured video data recorded in the recording unit 33 to the recording server 50 or the cloud server 70 through the wide-area communication unit 34 and the network NW1 (for example, Internet).

The recording unit 33 may include a semiconductor memory added in the camera 10 (for example, flash memory) or an external memory medium such as a memory card (for example, SD card), which is not added in the camera 10. The recording unit 33 may correlate the captured video data generated by the processor 32 with the identification information of the camera 10 (an example of the camera information) or the date and time information during capturing, and record the resultant data. Furthermore, the recording unit 33 may correlate the captured video data transmitted from the slave cameras (for example, the cameras 11 to 13) with the identification information of the slave cameras (an example of camera information) or the date and time information during capturing, and record the resultant data. The recording unit 33 normally pre-buffers and stores data of a video captured for a predetermined time, and continuously stores data of a video captured for a predetermined time (for example, 30 seconds) before the current time. When the recording unit 33 is configured as a memory card, the recording unit may be freely inserted into and removed from the casing of the camera 10.

The wide-area communication unit 34 is configured using a communication circuit. The wide-area communication unit 34 transmits the captured video data recorded in the recording unit 33 to the recording server 50 or the cloud server 70 through the wired network NW1 such as the Internet, based on an instruction of the processor 32. The wide-area communication unit 34 may receive a control command of the camera, transmitted from the outside (for example, the recording server 50 or the cloud server 70), or transmit status information of the camera to the outside (for example, the recording server 50 or the cloud server 70).

The local communication unit 35 is configured using a communication circuit. The local communication unit 35 may transmit the control command of the camera, received by the wide-area communication unit 34, to the slave cameras (for example, the cameras 11 to 13) through short range wireless communication, for example, or receive data of captured videos transmitted from the respective slave cameras (for example, the cameras 11 to 13).

The memory 36 is configured using a RAM and ROM, for example, and temporarily stores a program or data required for performing an operation of the camera 10 and information or data generated during the operation of the camera 10. The RAM is a work memory used during an operation of the processor 32, for example. The ROM stores a program and data for controlling the processor 32 in advance. The memory 36 stores identification information for identifying the camera 10 (for example, serial number) and various pieces of setting information.

FIG. 4 is a block diagram illustrating internal configurations of the recording server 50 and the retrieval terminal 90 according to the embodiments. The recording server 50 and the retrieval terminal 90 may be connected through the Intranet such as a wired LAN provided in the police station, or connected through a local wireless network (for example, wireless LAN).

The recording server 50 includes a communication unit 51, a storage unit 52, a video retrieval unit 53, a video analysis unit 54, a tag assignment unit 55, a pattern extraction unit 56 and a memory 57. The video retrieval unit 53, the video analysis unit 54, the tag assignment unit 55 and the pattern extraction unit 56 are configured as processors such as a CPU, MPU, DSP and FPGA, for example.

The communication unit 51 is configured using a communication circuit. The communication unit 51 communicates with a master camera (for example, the camera 10 or 20) connected through the network NW1 such as the Internet, and receives a captured video transmitted from the master camera (that is, a video showing the situation at the intersection). The communication unit 51 communicates with the retrieval terminal 90 through a network such as the Intranet, provided in the police station, receives a request (instruction) transmitted from the retrieval terminal 90, or transmits a response to the request (instruction). The communication unit 51 transmits a part of the data of the captured video, stored in the storage unit 52, to the cloud server 70.

The storage unit 52 is configured as a hard disk drive (HDD) or solid state driver (SSD). The storage unit 52 correlates data of a captured video, transmitted from the master camera (for example, the camera 10 or 20), with the identification information of the camera having captured the video (an example of camera information) or the date and time information during capturing, and then records the resultant data. The storage unit 52 also records road map information including a plurality of intersections, for example, records updated road map information whenever the road map information is updated by a new construction of road. The storage unit 52 records intersection camera installation data indicating the corresponding relation between one or more cameras installed at each intersection and the intersection. The intersection camera installation data may be correlated with the identification information (an example of intersection information, for example, an intersection ID) of the intersection and the identification information (camera ID) of the cameras. In the following descriptions, the same applies. Therefore, the storage unit 52 correlates the captured video data of the cameras with the camera information and the intersection information, and records the resultant data.

The video retrieval unit 53 retrieves captured video data satisfying a retrieval key among the captured video data recorded in the storage unit 52, based on a retrieval request (retrieval instruction) transmitted from the retrieval terminal 90 and containing the retrieval key, and transmits data of the retrieval result through the communication unit 51 such that the data are displayed on the output unit 94 of the retrieval terminal 90.

The video analysis unit 54 analyzes the captured video data recorded in the storage unit 52, and extracts and acquires information on a subject (for example, a person or vehicle) appearing in the captured video. The video analysis unit 54 may acquire information on subjects, and transmit the acquired information and the captured video data to the tag assignment unit 55 or record the acquired information and the captured video data, which is a video analysis target, in the storage unit 52. The information on subjects may include information on the type, color or number plate of a vehicle (for example, a getaway vehicle having caused an incident or accident), information capable of specifying a person in the vehicle, or information on the number of people in the vehicle.

The tag assignment unit 55 correlates the information (tag information) on the video analysis result transmitted from the video analysis unit 54 with the captured video data set to a video analysis target by the video analysis unit 54, and records the resultant data in the storage unit 52. When assigning the tag information to the captured video data, the tag assignment unit 55 also correlates the captured video data with the date and time information of the captured video set to the video analysis target by the video analysis unit 54 and the identification information of the camera having captured the video, and records the resultant data in the storage unit 52. Accordingly, the recording server 50 can clearly determine the location of the intersection where the video was captured, the date and time information of the captured video, and the tag information assigned to the captured video.

The pattern extraction unit 56 determines whether vehicles have the same behavior patterns when routinely passing the intersection, using the tag information and the captured video data which are stored in the storage unit 52. When determining that the behavior patterns are present, the pattern extraction unit 56 records (stores) information on the behavior patterns as pattern information in the storage unit 52. For example, based on a histogram (frequency) of information on the dates and times at which each vehicle has passed the intersection, for the number of the number plate of the vehicle, the pattern extraction unit 56 extracts information on the date and time at which the peak of the histogram was acquired, as the pattern information.

The memory 57 is configured using a RAM and ROM, for example, and temporarily stores a program or data required for performing an operation of the recording server 50 and information or data generated during the operation of the recording server 50. The RAM is a work memory used during an operation of a processor PRC1, for example. The ROM stores a program and data for controlling the processor PRC1 in advance. The memory 57 stores identification information for identifying the recording server 50 (for example, serial number) and various pieces of setting information.

The retrieval terminal 90 includes an operation unit 91, a processor 92, a communication unit 93, an output unit 94 and a memory 95. The retrieval terminal 90 is used by an official (that is, a policeman) in the police station. When a witness to an event such as an incident or accident made a call to report the occurrence of the event, the policeman responds to the call with a headset HDS worn on his head. The headset HDS is connected to the retrieval terminal 90, and collects voice generated by the policeman or outputs voice of the reporter, transmitted through a telephone (not illustrated) through which the incoming call was made.

The operation unit 91 is an UI (User Interface) for detecting an input operation of the operator, and may include a mouse or keyboard. The operation unit 91 outputs a signal based on the input operation of the policeman to the processor 92. When the operator wants to check the captured video of the intersection at the date and time that the policeman wants to investigate, the operation unit 91 receives an input of a retrieval key containing the date and time information and the intersection information (for example, the location information of the intersection). Furthermore, when the operator wants to check a captured video of a vehicle (for example, a getaway vehicle) at the date and time that the policeman wants to investigate, the operation unit 91 receives an input of a retrieval key containing the date and time information and vehicle information (for example, the type or color of the vehicle).

The processor 92 is configured using a CPU, MPU, DSP or FPGA, for example, functions as a control unit of the retrieval terminal 90, performs a control process of controlling overall operations of the respective units of the retrieval terminal 90, a data input/output process among the respective units of the retrieval terminal 90, a data calculation process and a data storage process. The processor 92 operates according to a program and data stored in the memory 95. The processor 92 uses the memory 95 during operation, and acquires the current time information or displays retrieval result data for various captured videos on the output unit 94, the retrieval result data being transmitted from the recording server 50 or the cloud server 70. In response to the input of the retrieval key transmitted from the operation unit 91, the processor 92 generates a retrieval request (retrieval instruction) including the retrieval key and transmits the retrieval request (retrieval instruction) to the recording server 50 or the cloud server 70 through the communication unit 93.

The communication unit 93 is configured using a communication circuit. The communication unit 93 communicates with the cloud server 70 connected through a network NW3 such as the Internet, and receives various captured videos transmitted from the cloud server 70 (for example, a captured video requested by the retrieval terminal 90). The communication unit 93 communicates with the recording server 50 through a network such as the Intranet, provided in the police state, and transmits a retrieval request (instruction) for various captured videos to the recording server 50), or receives a response to the request (instruction). The various captured videos may include a captured video of a vehicle or intersection which the policeman wants to investigate.

The output unit 94 is configured using a display such as an LCD (Liquid Crystal Display) or organic EL (Electroluminescence), for example, and displays various captured video data transmitted from the processor 92. The output unit 94 may also be configured as a speaker, for example, and output a voice signal (for example, a predetermined warning sound) sent from the processor 92.

The memory 95 is configured using a RAM and ROM, for example, and temporarily stores a program or data required for performing an operation of the retrieval terminal 90 and information or data generated during the operation of the retrieval terminal 90. The RAM is a work memory used during an operation of the processor 92, for example. The ROM stores a program and data for controlling the processor 92 in advance. The memory 95 stores identification information for identifying the retrieval terminal 90 (for example, serial number) and various pieces of setting information.

The storage unit 96 is configured using a hard disk (HDD) or a solid state drive (SSD), for example. The storage unit 96 stores a report template (see FIG. 7B) used at the time of generating an image retrieval key (to be described below) generated by the processor 92 for each type of event such as an incident or accident. The storage unit 96 records data of the captured image or the captured video transmitted from the recording server 50 or the cloud server 70 in correlation with identification information (an example of camera information) of the camera which captures the captured image or the captured video, intersection information at which the camera is installed, date information at the time of image capturing. The storage unit 96 may record intersection camera installation data indicating the corresponding relation between one or more cameras installed at each intersection and the intersection. In this case, the storage unit 96 records the data of the captured video of the camera in correlation with the camera information and the intersection information.

Figure 5:
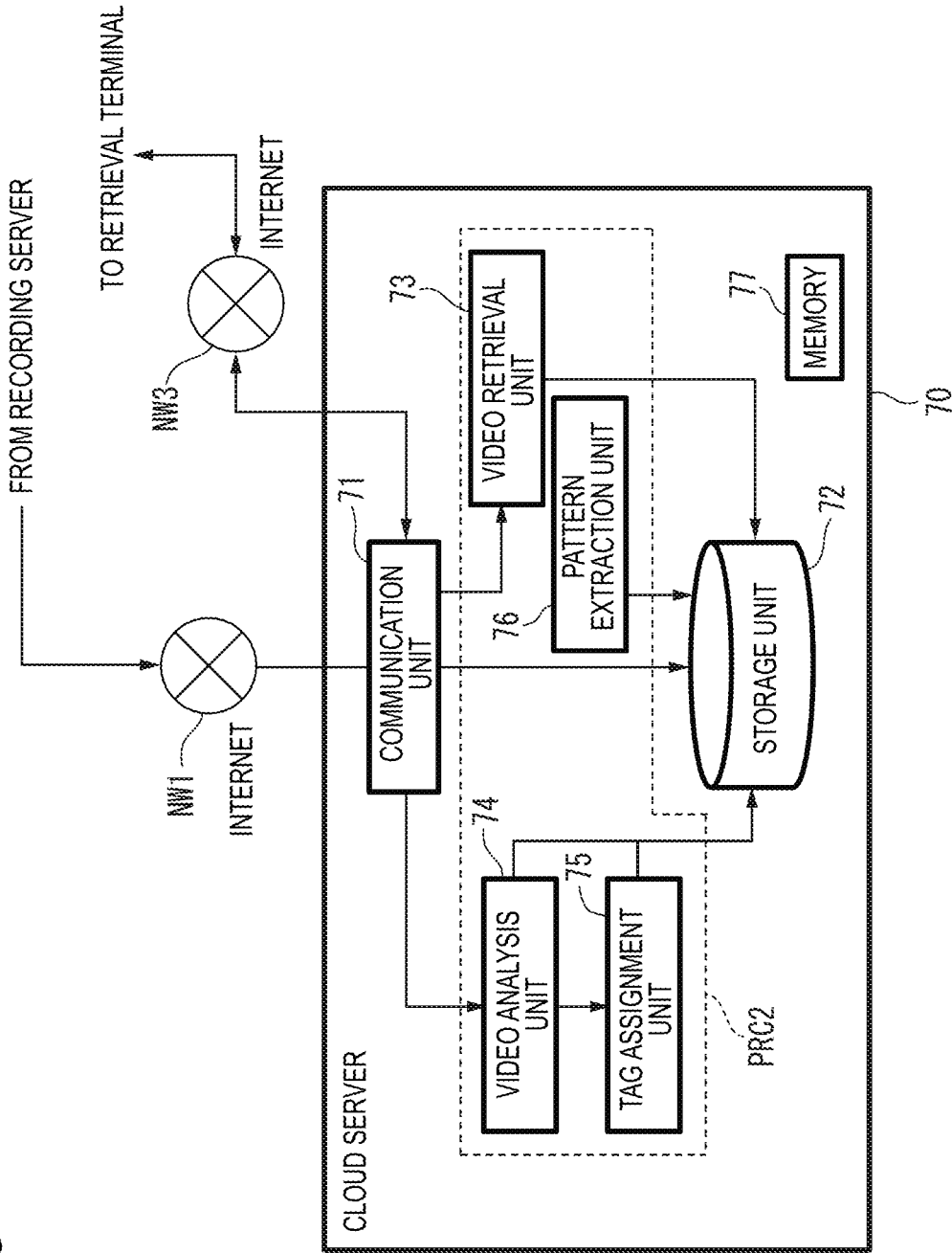
FIG. 5 is a block diagram illustrating an example of an internal configuration of a cloud server according to embodiments.

FIG. 5 is a block diagram illustrating an internal configuration of the cloud server 70 according to the embodiments. The cloud server 70 is connected so as to communicate with the recording server 50 through the network NW1 such as the Internet, and connected so as to communicate with the retrieval terminal 90 through the network NW3 such as the Internet.

The cloud server 70 includes a communication unit 71, a storage unit 72, a video retrieval unit 73, a video analysis unit 74, a tag assignment unit 75, a pattern extraction unit 76 and a memory 77. The video retrieval unit 73, the video analysis unit 74, the tag assignment unit 75 and the pattern extraction unit 76 are configured as processors such as a CPU, MPU, DSP and FPGA, for example.

The communication unit 71 is configured using a communication circuit. The communication unit 71 performs communication with the recording server 50 connected through the network NW1 such as the Internet, and receives a captured video transmitted from the recording server 50. The captured video may include a captured video designated through an operation of a terminal (not illustrated) used by a manager, for example, a captured video of an important or serious incident. The communication unit 71 performs communication with the retrieval terminal 90 through the network NW3 such as the Internet, and receives a request (instruction) transmitted from the retrieval terminal 90, or transmits a response to the request (instruction).

The storage unit 72 is configured using a HDD or SSD, for example. The storage unit 72 correlates captured video data transmitted from the master camera (for example, the camera 10 or 20) or the recording server 50 with the identification information of the camera having captured the video (an example of camera information) or the date and time information during capturing, and records the resultant data. The storage unit 72 may also record road map information including a plurality of intersections, or record updated road map information whenever the road map information is updated by a new construction of road. The storage unit 72 records intersection camera installation data indicating the corresponding relation between one or more cameras installed at each intersection and the intersection. Therefore, the storage unit 72 correlates the captured video data of the cameras with the camera information and the intersection information, and records the resultant data.

Based on a retrieval request (retrieval instruction) transmitted from the retrieval terminal 90 and containing a retrieval key, the video retrieval unit 73 retrieves captured video data satisfying the retrieval key among the captured video data recorded in the storage unit 72, and transmits data of the retrieval result through the communication unit 51 such that the data are displayed on the output unit 94 of the retrieval terminal 90.

The video analysis unit 74 analyzes the captured video data recorded in the storage unit 72, and extracts and acquires information on a subject (for example, a person or vehicle) appearing in the captured video. The video analysis unit 74 may acquire information on subjects, and transmit the acquired information and the captured video data set to the video analysis target to the tag assignment unit 75 or record the acquired information and the captured video data in the storage unit 72. The information on the subjects may include information on the type or color of a vehicle (for example, a getaway vehicle having caused an incident or accident), or information capable of specifying a person in the vehicle.

The tag assignment unit 75 correlates the information (tag information) on the video analysis result transmitted from the video analysis unit 74 with the captured video data set to the video analysis target by the video analysis unit 74, and records the resultant data in the storage unit 72. When assigning the tag information to the captured video data, the tag assignment unit 75 also correlates the captured video data with the date and time information of the captured video set to the video analysis target by the video analysis unit 74 or the identification information of the camera having captured the video, and records the resultant in the storage unit 72. Accordingly, the recording server 70 can clearly determine the location of an intersection where a video was captured, the date and time information of the captured video, and tag information assigned to the captured video.

The pattern extraction unit 76 determines whether vehicles have the same behavior patterns when routinely passing an intersection, using the tag information and the captured video data which are recorded in the storage unit 72. When determining that the behavior patterns are present, the pattern extraction unit 76 records (stores) information on the behavior patterns as pattern information in the storage unit 72. For example, based on a histogram (frequency) of information on the dates and times at which each vehicle has passed the intersection, for the number of the number plate of the vehicle, the pattern extraction unit 76 extracts information on the date and time at which the peak of the histogram was acquired, as the pattern information.

The memory 77 is configured using a RAM and ROM, for example, and temporarily stores a program or data required for performing an operation of the cloud server 70 and information or data generated during the operation of the cloud server 70. The RAM is a work memory used during an operation of a processor PRC2, for example. The ROM stores a program and data for controlling the processor PRC2 in advance. The memory 77 stores identification information for identifying the cloud server 70 (for example, serial number) and various pieces of setting information.

Figure 6:
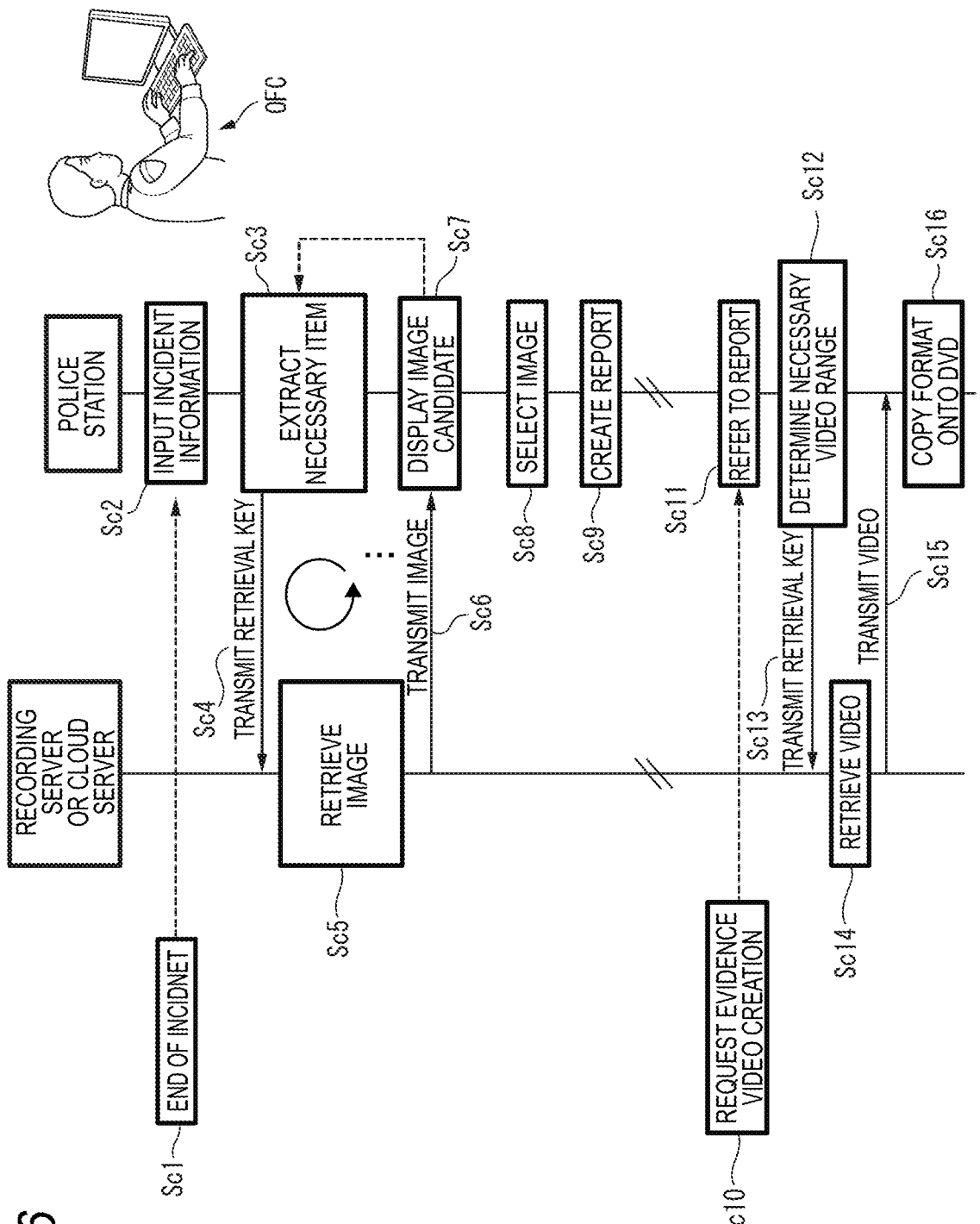
FIG. 6 is a sequence diagram illustrating an example of an operation procedure of a report generation scenario in the report creation assist system according to each of embodiments.

FIG. 6 is a sequence diagram illustrating an example of an operation procedure of a report generation scenario in a report creation assist system according to each of embodiments. For example, in a case where an event such as an incident or accident has occurred at or around the intersection ends, a report creation scenario illustrated in FIG. 6 indicates an example of an operation procedure (use case) specifically executed by the report creation assist system 100 when a report (so-called crime report) is created by a policeman in charge of the event. In FIG. 6, a case where a report is created with the end of incident will be illustratively described.

In FIG. 6, when the incident ends (Sc1), a policeman OFC in charge of the incident inputs information (that is, incident information) on the incident to the retrieval terminal 90 so as to create a report of the incident (Sc2). In order to retrieve images to be posted on the incident report from the recording server 50 or the cloud server 70, based on the incident information input by the input operation of the policeman OFC, the retrieval terminal 90 extracts various items necessary for the retrieval (Sc3). The retrieval terminal 90 acquires information or data of various items obtained by the extraction in step Sc3 and generates an image retrieval key. The retrieval terminal 90 transmits the generated image retrieval key to the recording server 50 or the cloud server 70 (Sc4).

Based on the image retrieval key transmitted from the retrieval terminal 90 in step Sc4, the recording server 50 or the cloud server 70 retrieves data of the captured image of the corresponding camera satisfying the image retrieval key (Sc5). The recording server 50 or the cloud server 70 transmits the data of the captured image of the retrieval result in step Sc5 to the retrieval terminal 90 (Sc6). The retrieval terminal 90 outputs (for example, displays) the data of the captured image transmitted from the recording server 50 or the cloud server 70 in step Sc6 to the output unit 94 (Sc7). At this point, when the policeman OFC obtains an image suitable for being posted on the report, the report creation scenario proceeds to step Sc8. On the other hand, when the policeman OFC does not obtain an image suitable for being posted on the report, the report creation scenario returns to step Sc3, steps Sc3 to Sc7 are repeated until the policeman OFC obtains the image suitable for being posted on the report.

After the policeman OFC obtains the image suitable for being posted on the report, the retrieval terminal 90 selects the designated image by the input operation of the policeman OFC (Sc8), and creates the report using the selected image (Sc9). The data of this report may be stored in the storage unit 96, for example, or may be stored in another storage unit different from the storage unit 96.

In addition, at a timing different from the creation timing of the report, the police station may be asked to submit evidence video showing a situation when the incident has occurred, from a prosecutor who investigates whether to prosecute the criminal of the incident arrested by the police or a judge of the court (Sc10). Upon the request of such submission, the retrieval terminal 90 reads out the report created in step Sc9 through an input operation of a policeman (hereinafter, referred to as "evidence video creator" for convenience) different from the policeman in charge of the relevant incident of the police station and refers to it (Sc11).

In order to retrieve the evidence video from the recording server 50 or the cloud server 70 based on the input operation of the evidence video creator, the retrieval terminal 90 determines an extraction condition of the video necessary for the retrieval (Sc12). The retrieval terminal 90 acquires information or data indicating the extraction condition of the video determined in step Sc12 and generates a video retrieval key. The retrieval terminal 90 transmits the generated video retrieval key to the recording server 50 or the cloud server 70 (Sc13).

Based on the video retrieval key transmitted from the retrieval terminal 90 in step Sc13, the recording server 50 or the cloud server 70 retrieves data of the captured video of the corresponding camera satisfying the video retrieval key (Sc14). The recording server 50 or the cloud server 70 transmits the data of the captured video of the retrieval result in step Sc14 to the retrieval terminal 90 (Sc15). The retrieval terminal 90 outputs (for example, displays) the data of the captured video transmitted from the recording server 50 or the cloud server 70 in step Sc15 to the output unit 94. The retrieval terminal 90 converts the data format of the captured video into a predetermined format for submission (for example, MP4) by the input operation of the evidence video creator who visually confirms the data of the captured video displayed on the output unit 94, and copies the converted format onto a DVD (Digital Versatile Disk) (Sc16). Thus, the evidence video requested by the prosecutor or the judge of the court can be submitted.

Figure 7A:
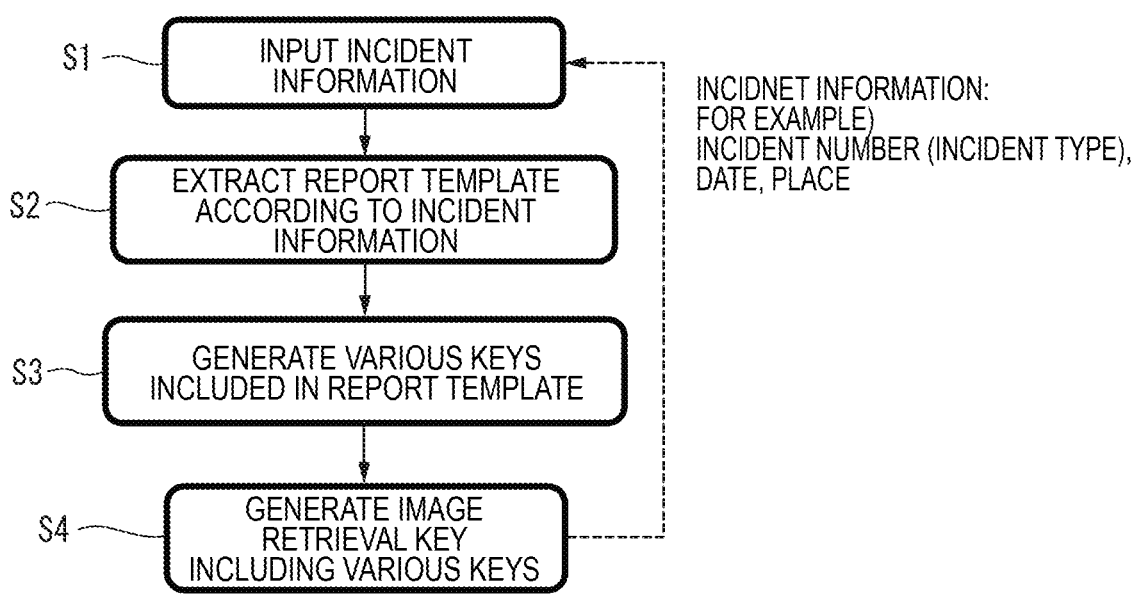
FIG. 7A is a flowchart illustrating an example of an operation procedure of a generation process of a retrieval key for image retrieval in a retrieval terminal according to a first embodiment.
Figure 7E:
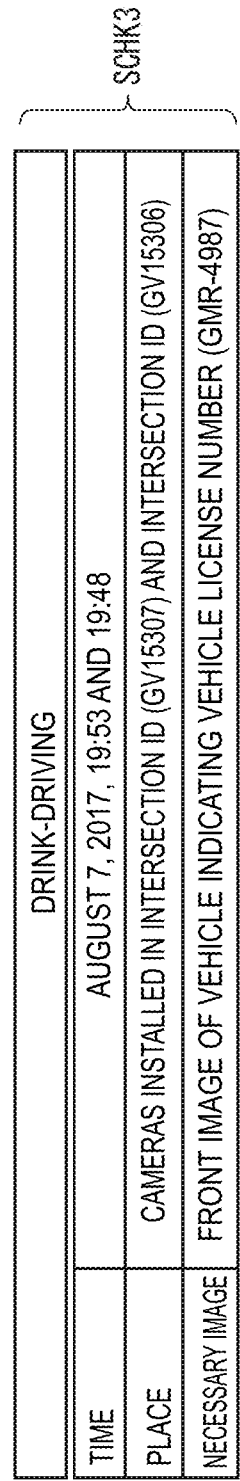
FIG. 7E is a diagram illustrating an example of an image retrieval key for image retrieval relating to a traffic accident.

FIG. 7A is a flowchart illustrating an example of an operation procedure of a generation process of a retrieval key for image retrieval in the retrieval terminal 90 according to the first embodiment. FIG. 7B is a diagram illustrating an example of a report template corresponding to the type of incident or accident. FIG. 7C is a diagram illustrating an example of an image retrieval key SCHK1 for image retrieval relating to a signal ignoring. FIG. 7D is a diagram illustrating an example of an image retrieval key SCHK2 for image retrieval relating to a traffic accident. FIG. 7E is a diagram illustrating an example of an image retrieval key SCHK3 for image retrieval relating to drink-driving. The retrieval key generation process illustrated in FIG. 7A is executed in step Sc3 of the report creation scenario illustrated in FIG. 6.

In FIG. 7A, the retrieval terminal 90 (an example of an image retrieval assist device) receives incident information input by the input operation of the policeman in charge of the incident finished in step Sc1 of FIG. 6 (S1). The incident information input in step S1 is information relating to an incident number (or incident type), information on date and place where the incident has occurred, and information on a traveling direction of a vehicle (for example, a vehicle involved in the occurrence of the incident) involved in the incident at the time of the occurrence of the incident, for example.

The retrieval terminal 90 extracts a report template according to the incident number or the incident type of the incident information input in step S1 (S2).

Here, the report template will be described with reference to FIG. 7B.

The report template is data that stores an image or video extraction condition indicating the situation at the time of event occurrence for each type of incident or accident event.

For example, FIG. 7B illustrates a report template TP1 in which the incident type corresponds to "signal ignoring", a report template TP2 in which the incident type corresponds to "traffic accident", and a report template TP3 in which the incident type corresponds to "drink-driving". In FIG. 7B, only the report templates corresponding to the "signal ignoring", the "traffic accident", and the "drink-driving" are illustrated, but the report templates are not limited thereto.

As the image or video extraction conditions indicating the situation at the time of occurrence of the "signal ignoring", the report template TP1 includes a "time" that is extracted and defined as "from one minute before the occurrence of the incident to one minute after the occurrence of the incident", a "place" that is extracted and defined as "camera corresponding to an intersection ID which is identification information of an intersection at which the incident has occurred", and a "necessary image" that is extracted and defined as "captured image (that is, a front image of a vehicle) of a camera which captures a signal ignoring vehicle in a direction opposite to a traveling direction".

As the image or video extraction conditions indicating the situation at the time of occurrence of the "traffic accident", the report template TP2 includes a "time" that is extracted and defined as "every one minute from one minute before the occurrence of the incident to ten minutes after the occurrence of the incident", a "place" that is extracted and defined as "camera corresponding to an intersection ID which is identification information of an intersection at which the incident has occurred", and a "necessary image" that is extracted and defined as "captured images (that is, captured images of cameras from all directions) of all cameras installed at an intersection".

As the image or video extraction conditions indicating the situation at the time of occurrence of the "drink-driving", the report template TP3 includes a "time" that is extracted and defined as "a time of occurrence of the incident and a time at which a vehicle is staying at an immediately preceding intersection (for example, a time obtained by subtracting a time when the vehicle averagely moves on the distance from the incident occurrence to the immediately preceding intersection from the time of the incident occurrence", a "place" that is extracted and defined as "camera corresponding to an intersection ID which is identification information of an intersection at which the incident has occurred" and a camera corresponding to an intersection ID which is identification information of an immediately preceding intersection", and a "necessary image" that is extracted and defined as "captured image (that is, a front image of a vehicle) of a camera which captures a drink-driving vehicle in a direction opposite to a traveling direction". The calculation of the "time at which the vehicle is staying at the intersection immediately before the incident occurrence" in the report template TP3 may be performed by the retrieval terminal 90 in step S3, for example, or may be performed by, for example, the recording server 50 or the cloud server 70 without being performed by the retrieval terminal 90 in step S3.

Based on the incident information input in step S1 and the report template extracted in step S2, the retrieval terminal 90 generates various keys included in the report template (S3). Herein, the keys correspond to actual contents of various items (for example, "time", "place", and "necessary image").

In step S3, that is, the retrieval terminal 90 generates, as the key corresponding to the "signal ignoring", for example, a "time: Aug. 10, 2017, 17:05 to Aug. 10, 2017, 17:07", a "place: a camera installed in an intersection ID (AX90119)", and a "necessary image: a front image of vehicle indicating the vehicle license number (JJJ-5403)" (see FIG. 7C).

In addition, the retrieval terminal 90 generates, as the key corresponding to the "traffic accident", for example, a "time: every one minute from Aug. 12, 2017, 9:55 to Aug. 12, 2017, 10:06", a "place: a camera installed in an intersection ID (BF58203)", and a "necessary image: captured imaged of all four cameras" (see FIG. 7D).

In addition, the retrieval terminal 90 generates, as the key corresponding to the "drink-driving", for example, a "time: Aug. 7, 2017, 19:53 and 19:48", a "place: cameras installed in intersections IDs (GV15307 and GV15306)", and a "necessary image: a front image of vehicle indicating the vehicle license number (GMR-4987)" (see FIG. 7E). The intersections GV15307 and GV15306, which are serial numbers, are geographically adjacent to each other.

The retrieval terminal 90 generates an image retrieval key including various keys generated in step S3 (S4). The retrieval terminal 90 generates the image retrieval key SCHK1 including various keys of "time", "place", and "necessary image" illustrated in FIG. 7C as the image retrieval key corresponding to the "signal ignoring", for example. The retrieval terminal 90 generates the image retrieval key SCHK2 including various keys of "time", "place", and "necessary image" illustrated in FIG. 7D as the image retrieval key corresponding to the "traffic accident", for example. The retrieval terminal 90 generates the image retrieval key SCHK3 including various keys of "time", "place", and "necessary image" illustrated in FIG. 7E as the image retrieval key corresponding to the "drink-driving", for example. The retrieval terminal 90 transmits the image retrieval key generated in step S4 to the recording server 50 or the cloud server 70 that records a large amount of images or videos with respect to events such as incidents or accidents (see step Sc4 in FIG. 6).

As described above, according to the report creation assist system 100 of the first embodiment, the retrieval terminal 90 (an example of the image retrieval assist device) is communicably connected to the recording server 50 or the cloud server 70 that records the captured images of the individual cameras installed in the plurality of intersections in correlation with the camera information and the intersection information. The retrieval terminal 90 stores the extraction condition of the image indicating the situation at the time of the event occurrence in the storage unit 96 (an example of an extraction condition storage unit) for each type of event (for example, incident or accident) that has occurred at the intersection. When the operation unit 91 (an example of an input unit) accepts the input of the event information (for example, incident information) including the type of event, the processor 92 (an example of a generation unit) of the retrieval terminal 90 generates the image retrieval key including the image extraction condition indicating the situation at the time of the event occurrence according to the input event information. The retrieval terminal 90 transmits the generated image retrieval key to the recording server 50 or the cloud server 70 via the communication unit 93.

Thus, when the policeman creates the report with the end of the incident or accident that has occurred at the intersection where many people and vehicles come and go, the retrieval terminal 90 can efficiently assist the retrieval of the image suitable for indicating the situation at the time of the incident or accident occurrence to reduce the work burden on the policeman. In other words, since the policeman can post on the report using the image received from the recording server 50 or the cloud server 70 by the retrieval terminal 90 only by inputting the incident information in a simple operation manner without creating separately the image retrieval key indicating the situation at the time of the incident occurrence, the burden at the time of creating the report can be considerably reduced.

In addition, the processor 92 of the retrieval terminal 90 outputs the captured image of the camera satisfying the image retrieval key sent from the recording server 50 or the cloud server 70 to the output unit 94. Thus, the policeman using the retrieval terminal can visually confirm the image to be posted on the incident report, so that it is possible to select a more suitable image and improve the quality of the report.

Further, the event information (for example, incident information) includes at least the information on the traveling direction at the time of occurrence of the event of the vehicle involved in the occurrence of the event (for example, the incident) and the information on the intersection at which the event has occurred. The processor 92 (an example of the generation unit) of the retrieval terminal 90 generates, as an image retrieval key, an extraction condition of the captured image of the camera that captures the front of the vehicle running in the traveling direction for X (X: a default value, for example, X=1) minutes before and after the occurrence of the event (see FIG. 7C). Thus, for example, when the incident such as signal ignoring occurs, the retrieval terminal 90 can generate the image retrieval key capable of efficiently retrieving the captured image of the front of the vehicle, which ignores a signal, without the operational burden on the policeman. When the front image of the vehicle is obtained for about two minutes before and after the signal ignoring is detected, the policeman can easily determine whether the driver of the vehicle intentionally ignores the signal, for example, can grasp the situation at the time of the occurrence of the signal ignoring, and can describe the situation on the report in detail.

In addition, the event information (for example, incident information) includes at least the information on the traveling direction at the time of occurrence of the event of the vehicle involved in the occurrence of the event (for example, the incident) and the information on the intersection at which the event has occurred. The processor 92 (an example of the generation unit) of the retrieval terminal 90 generates, as an image retrieval key, an extraction condition of the captured images of all the cameras, which capture the vehicle running in the traveling direction for every W (W: a default value, for example, W=1) minute from Y (Y: a default value, for example, Y=1) minutes before the occurrence of the event until Z (Z: a default value, for example, Z=10) minutes after the occurrence of the event, corresponding to the intersection information (see FIG. 7D). Thus, for example, when the incident such as traffic accident occurs, the retrieval terminal 90 can generate the image retrieval key capable of efficiently retrieving the captured images in all directions of the vehicle, which causes the traffic accident, without the operational burden on the policeman. When the captured images in all directions of the vehicle are obtained every one minute for 11 minutes before and after the traffic accident is detected, the policeman can easily determine whether the driver who caused the traffic accident rescued the victim from the accident or ran away, for example, can grasp the situation at the time of the occurrence of the signal ignoring, and can describe the situation on the report in detail.

In addition, the event information (for example, incident information) includes at least the information on the traveling direction at the time of occurrence of the event of the vehicle involved in the occurrence of the event (for example, the incident) and the information on the intersection at which the event has occurred. The processor 92 (an example of the generation unit) of the retrieval terminal 90 generates, as an image retrieval key, an extraction condition of the captured image of the camera that captures the front of the vehicle running in the traveling direction at the time of the occurrence of the event and at the time of passing through the immediately preceding intersection (see FIG. 7E). Thus, for example, when the incident such as drink-driving occurs, the retrieval terminal 90 can generate the image retrieval key capable of efficiently retrieving the captured image of the front of the drink-driving vehicle, without the operational burden on the policeman. When the captured image of the front of the drink-driving vehicle are obtained at the time of the drink-driving incident or at the time of passing through the immediately preceding intersection, the policeman can easily determine whether the driver of the vehicle was drunk, for example, can grasp the situation at the time of the occurrence of the drink-driving, and can describe the situation on the report in detail.

Background to Second Embodiment

In JP-A-2007-174016, the camera image information captured by the plurality of cameras is displayed on the display device in the terminal device mounted on the vehicle. Therefore, the user (for example, driver) can check real-time captured images at the locations where the respective cameras are disposed. In JP-A-2007-174016, however, a technique is not considered which extracts an image suitable for the situation at the time of the occurrence of incident or accident, as an image to be posted on the report created with the end of the incident or accident that has occurred at the intersection at which many people or vehicles come and go. In particular, since view angles of the plurality of cameras installed at the intersection are set to be directed to the center of the intersection, there is a blind spot which cannot be reflected only by the captured image of the camera when an incident or accident occurs at the edge of the intersection. For this reason, even in the case of using the technique disclosed in JP-A-2007-174016 when the policeman creates a report with the end of the above-described accident or incident, the captured image, which is simply used as it is, of at least one camera installed at the intersection is not used as an image suitable for the situation at the time of the occurrence of the incident or accident, and thus an appropriate image is hardly posted on the report.

Therefore, in view of the above-described circumstances, an example of an image supplementing device and an image supplementing method is described in the following second embodiment in which, when the policeman creates a report with the end of the an incident or accident that has occurred at an edge of the intersection at which many people or vehicles come and go, the image of the blind spot not being reflected in the captured image of the camera installed at the intersection is supplemented by recording data of other vehicles that have existed at the time of the occurrence of the incident or accident and an appropriate image capable of being posted on the report is acquired.

Second Embodiment

Since a configuration of a report creation assist system according to a second embodiment is the same as that of the report creation assist system 100 according to the first embodiment, the same components are represented by the same reference numerals, the detailed descriptions thereof are simplified or omitted, and the following descriptions will be given on different components.

Figure 8A:
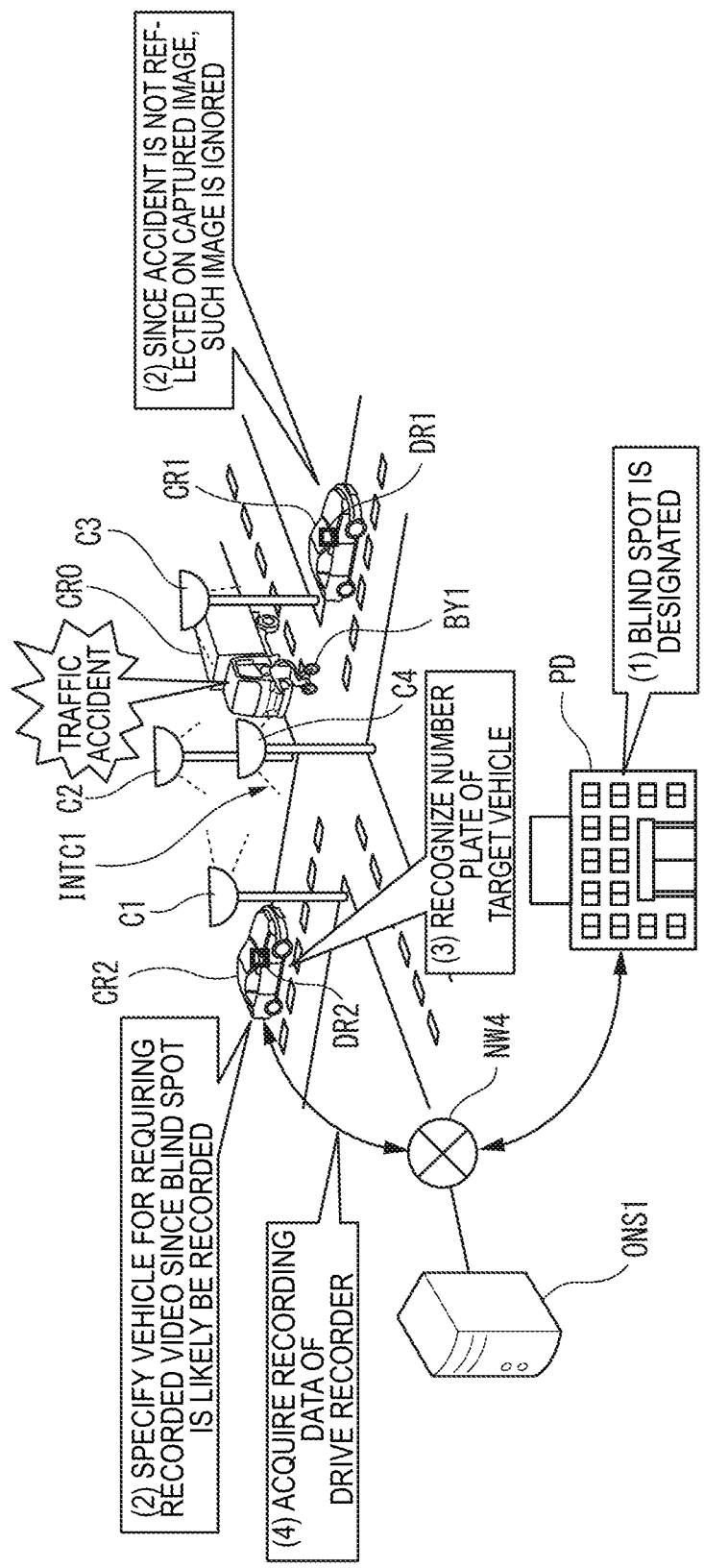
FIG. 8A is an explanatory diagram of an operation outline concerning acquisition of recording data at the time of occurrence of a traffic accident in the retrieval terminal according to a second embodiment.
Figure 8B:
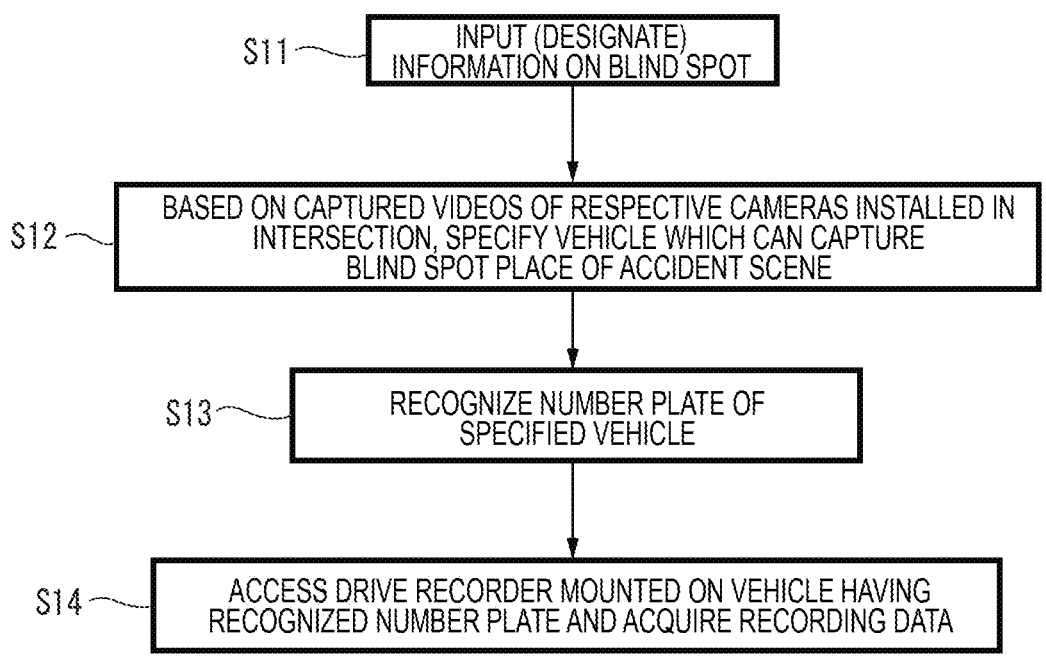
FIG. 8B is a flowchart illustrating an example of an operation procedure of acquisition processing of the recording data at the time of the occurrence of the traffic accident in the retrieval terminal according to the second embodiment.

FIG. 8A is an explanatory diagram of an operation outline concerning acquisition of recording data at the time of occurrence of a traffic accident in the retrieval terminal 90 according to the second embodiment. FIG. 8B is a flowchart illustrating an example of an operation procedure of acquisition processing of the recording data at the time of the occurrence of the traffic accident in the retrieval terminal 90 according to the second embodiment. The acquisition processing of the recording data illustrated in FIG. 8B is executed in step Sc7 of the report creation scenario illustrated in FIG. 6.

In the retrieval terminal 90 in a police station PD, as a premise of the description of FIGS. 8A and. 8B, the communication unit 93 receives data transmitted from the recording server 50 or the cloud server 70 by an input operation of a policeman in charge of the traffic accident, the data being video data captured by cameras C1, C2, C3, and C4 installed in an intersection INTC1, at which the traffic accident has occurred, being recorded in the storage unit 96, and being output to the output unit 94. The traffic accident is caused by collision between a vehicle CR0 and a bicycle BY1 at an edge of intersection INTC1, for example.

A capturing view angle of each of the cameras C1 to C4 is mainly set to be directed to the center of the intersection INTC1 in many cases. The second embodiment proposes an example in which the traffic accident caused by the collision between the vehicle CR0 and the bicycle BY1 occurs at the edge of the intersection INTC1 and the occurrence location of the traffic accident is a blind spot at the time of image capturing of the cameras C1 to C4. When there is the blind spot at the time of image capturing, an image suitable for indicating the situation at the time of the occurrence of the traffic accident cannot be obtained only by the captured videos of the cameras C1 to C4, and an image capable of being posted on the report may not be acquired.

In the second embodiment, therefore, when the blind spot of the captured video at the time of the occurrence of the traffic accident displayed on the output unit 94 is specified by the input operation of the policeman, the processor 92 of the retrieval terminal 90 analyzes the presence or absence of a recording device (for example, a vehicle on which an in-vehicle camera and a drive recorder for capturing and recording a blind spot are mounted).

In the second embodiment, it is assumed that the vehicle is equipped with, for example, an in-vehicle camera capable of capturing the front of the vehicle viewed from a driver's seat and a drive recorder capable of recording the image captured by the in-vehicle camera. The drive recorder installed in each vehicle can communicate with a server device ONS1 via a wireless network NW4, for example, and periodically uploads (transmits) the image captured by each vehicle being driving. In other words, drive recorders DR1 and DR2 respectively mounted on vehicles CR1 and CR2 periodically transmit videos captured by an in-vehicle camera (not illustrated) mounted on each of the vehicles CR1 and CR2 to the server device ONS1. The video periodically transmitted in this way is stored in the server device ONS1. The retrieval terminal 90 in the police station PD is communicably connected to the server device ONS1 via the wireless network NW4 and can access the data of the video uploaded by the drive recorders DR1 and DR2.

In the example of FIG. 8A, when a traffic accident occurs, since the vehicle CR1 mounted with the in-vehicle camera (not illustrated) and the drive recorder DR1 has already passed the location where the traffic accident has occurred, a blind spot can be hardly captured and recorded. On the other hand, when the traffic accident occurs, since the vehicle CR2 mounted with the in-vehicle camera (not illustrated) and the drive recorder DR2 captures and records the occurrence location of the traffic accident in the front direction, the blind spot can be captured and recorded.

In FIG. 8B, when the blind spot of the captured video at the time of the occurrence of the traffic accident displayed on the output unit 94 is specified by the input operation of the policeman (S11), the processor 92 of the retrieval terminal 90 analyzes the presence or absence of a recording device (for example, a vehicle on which an in-vehicle camera and a drive recorder for capturing and recording a blind spot are mounted), which may capture and record the designated blind spot. For example, the processor 92 of the retrieval terminal 90 determines, using the data of the captured video at the time of the occurrence of the traffic accident, the presence or absence of a recording device (for example, a vehicle on which an in-vehicle camera and a drive recorder for capturing and recording a blind spot are mounted), which includes the designated blind spot as an image capturing range. When it is determined that such a recording device is present, the processor 92 of the retrieval terminal 90 specifies the recording device (for example, a vehicle on which an in-vehicle camera and a drive recorder for capturing and recording a blind spot are mounted) (S12).

In order to acquire detailed information of the recording device (for example, the vehicle CR2) specified in step S12, further, the processor 92 of the retrieval terminal 90 recognizes a number plate of the vehicle CR2 (S13). The method of recognizing the number plate can be realized a known technique without particularly being limited, and thus a detailed description thereof will not be presented herein. The retrieval terminal 90 accesses the server device ONS1 via the wireless network NW4 using the vehicle number of the recognized number plate, and acquires recording data of the drive recorder DR2 mounted on the vehicle CR2 (in other words, video data having a high possibility that the blind spot designated in step S11 is reflected) (S14). Thus, even when the policeman can hardly decide the situation at the time of the occurrence of the traffic accident due to the presence of the blind spot, with only the captured videos of the cameras C1 to C4, the policeman can supplement using the recording data of the captured video of the blind spot, so that it is possible to improve the quality of the report using a part of the captured video used for supplementation at the time of creating the report.

As described above, according to the report creation assist system 100 of the second embodiment, the retrieval terminal 90 (an example of an image supplementing device) is communicably connected to the recording server 50 or the cloud server 70 that records the captured images of the individual cameras installed in the plurality of intersections in correlation with the camera information and the intersection information. The communication unit 93 of the retrieval terminal 90 receives the captured image transmitted from the recording server 50 or the cloud server 70, the captured image being taken at the time of the occurrence of the event by at least one camera corresponding to any one of the plurality of intersections. When the captured image at the time of the occurrence of the event is being output to the output unit 94, the blind spot related to the event occurrence location in the captured image is input from the operation unit 91 (an example of an input unit) of the retrieval terminal 90. According to the input of the blind spot, the processor 92 of the retrieval terminal 90 specifies the recording device (for example, the vehicle on which the in-vehicle camera and the drive recorder for capturing and recording the blind spot are mounted), which captures and records the blind spot in the vicinity of the event occurrence location, using the captured image at the time of the occurrence of the event. The retrieval terminal 90 receives the data of the recorded video of the event occurrence location from the specified recording device (for example, the vehicle on which the in-vehicle camera and the drive recorder for capturing and recording the blind spot are mounted).

Thus, when the policeman creates the report with the end of the incident or accident that has occurred at the edge of the intersection where many people and vehicle come and go, the retrieval terminal 90 supplements the image of the blind spot, which cannot be reflected on the captured image of the camera installed at the intersection with the recording data of other vehicles that existed at the time of the occurrence of the incident or accident, whereby an appropriate image capable of being posted on the report can be acquired.

In addition, the recording device is a vehicle mounted with the recorder device (for example, the drive recorder) capable of recording the video during traveling. The processor 92 (an example of a specifying unit) of the retrieval terminal 90 recognizes the number plate of the vehicle mounted with the recorder device using the captured image at the time of the occurrence of the event. Thus, the retrieval terminal 90 can concretely specify the vehicle mounted with the in-vehicle camera and the drive recorder which capture and record the video of the blind spot, and thus can access conveniently the recording data of the drive recorder of the vehicle, based on the recognized number.

Background to Third Embodiment

In JP-A-2007-174016, the camera image information captured by the plurality of cameras is displayed on the display device in the terminal device mounted on the vehicle. Therefore, the user (for example, driver) can check real-time captured images at the locations where the respective cameras are disposed. In JP-A-2007-174016, however, a technique is not considered which extracts an image of a viewpoint (for example, an angle at which a vehicle causing an incident or accident can be more clearly identified) conforming to the intent of the policeman who creates a report, as an image to be posted on the report created with the end of the incident or accident that has occurred at the intersection at which many people or vehicles come and go. In particular, since view angles of the plurality of cameras installed at the intersection are set to be directed to the center or its periphery of the intersection, there is a blind spot (for example, a rear part of the vehicle causing the incident or accident) which cannot be reflected only by the captured image of the camera when the incident or accident occurs at a place away from the center of the intersection. For this reason, even in the case of using the technique disclosed in JP-A-2007-174016 when the policeman creates a report with the end of the above-described accident or incident, the captured image, which is simply used as it is, of at least one camera installed at the intersection is not used as an image suitable for the situation at the time of the occurrence of the incident or accident, and thus an appropriate image is hardly posted on the report.

Therefore, in view of the above-described circumstances, an example of an image supplementing device and an image supplementing method is described in the following third embodiment in which, when the policeman creates a report with the end of the an incident or accident that has occurred at an edge of the intersection at which many people or vehicles come and go, the image of the blind spot not being reflected in the captured image of the camera installed at the intersection is supplemented with a captured image of the same subject forming the blind spot after a certain time and an appropriate image capable of being posted on the report is acquired.

Third Embodiment

Since a configuration of a report creation assist system according to a third embodiment is the same as that of the report creation assist system 100 according to the first embodiment, the same components are represented by the same reference numerals, the detailed descriptions thereof are simplified or omitted, and the following descriptions will be given on different components.

Figure 9:
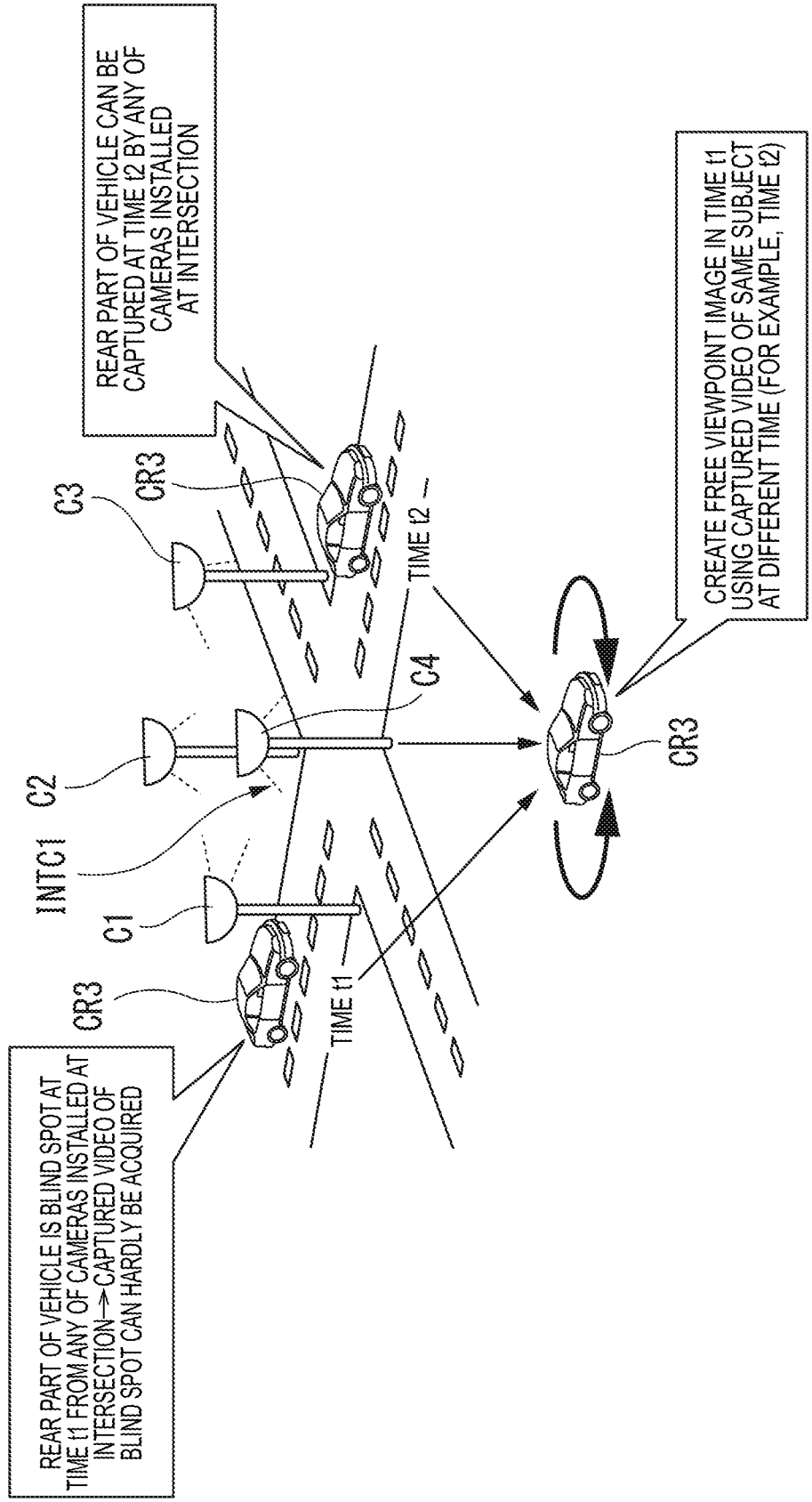
FIG. 9 is an explanatory diagram of an operation outline concerning generation of a free viewpoint image in the retrieval terminal according to a third embodiment.
Figure 10:
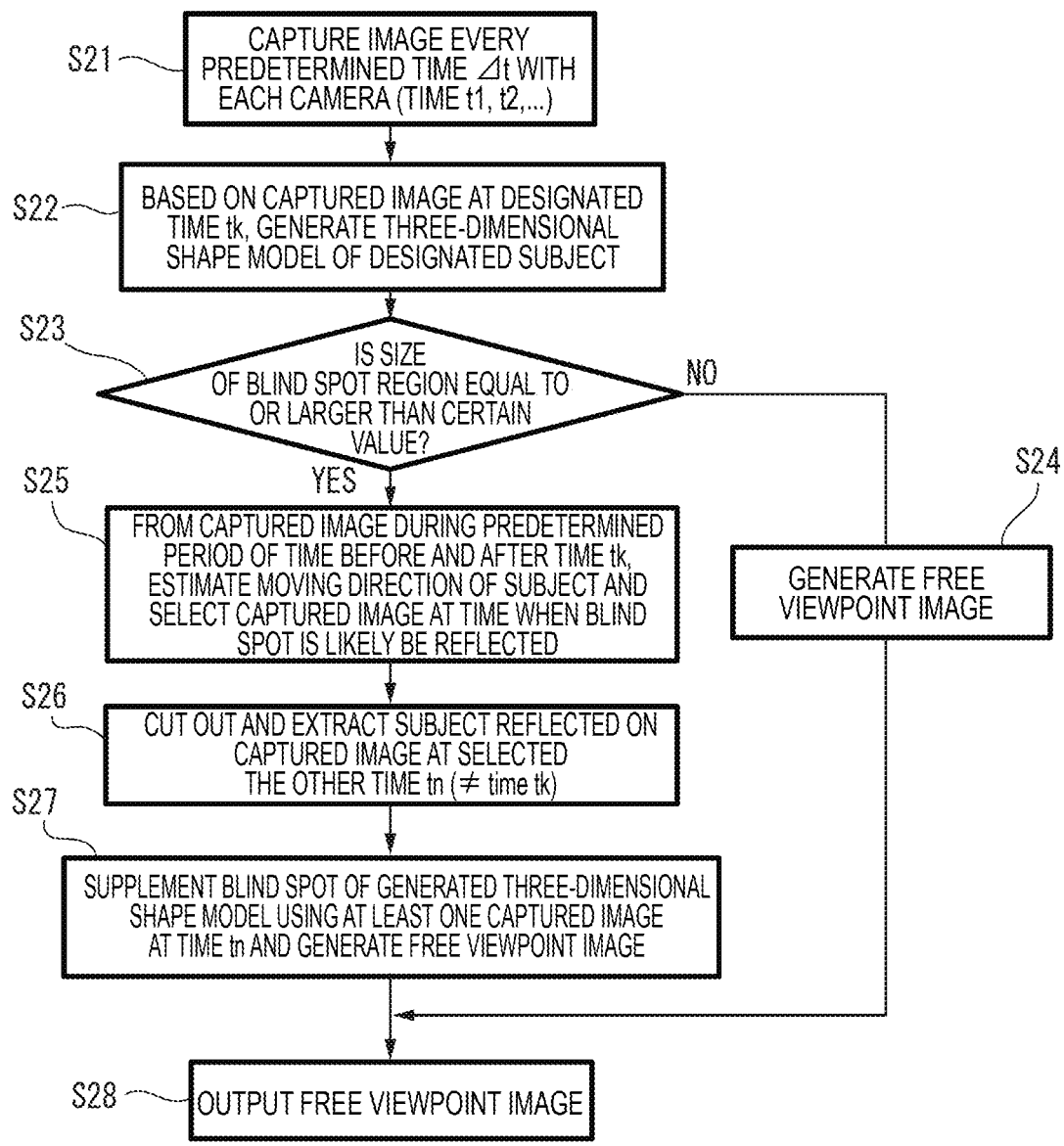
FIG. 10 is a flowchart illustrating an example of an operation procedure of generation processing of the free viewpoint image in the retrieval terminal according to a third embodiment.

FIG. 9 is an explanatory diagram of an operation outline concerning generation of a free viewpoint image in the retrieval terminal 90 according to the third embodiment. FIG. 10 is a flowchart illustrating an example of an operation procedure of generation processing of the free viewpoint image in the retrieval terminal 90 according to the third embodiment. The generation processing of the free viewpoint image illustrated in FIG. 10 is executed in step Sc7 of the report creation scenario in FIG. 6.

Using captured images of a plurality of cameras C1 to C4, the processor 92 of the retrieval terminal 90 according to the third embodiment generates a free viewpoint image conforming to a viewpoint designated by an input operation of a policeman using the retrieval terminal 90. A technique for generating the free viewpoint image is a technique which generates a three-dimensional shape model of a subject along a viewpoint (direction) designated by a user's input operation, using a plurality of images at a certain point of time and uses the plurality of images based on the three-dimensional shape model to generate an image of the subject along the viewpoint designated by the user. The technique for generating the free viewpoint image is a well-known technique, and thus a detailed description thereof will not be presented.

Originally, if an image suitable for indicating the detailed situation at the time of occurrence of an incident or accident can be obtained by the captured image of the plurality of cameras C1 to C4, as long as the policeman who creates a report uses the captured image of any camera as image to be posted on the report, the generation of the free viewpoint image expressly described above may be omitted. However, for example, when a traffic accident occurs at a place not reflected in the captured images of the cameras C1 to C4, the occurrence location of the traffic accident may be a blind spot at the time of image capturing of the cameras C1 to C4. As a technical countermeasure in this case, the retrieval terminal 90 according to the third embodiment can generate a free viewpoint image, which can supplement the image of the blind spot designated by the policeman, so as to obtain the image of the blind spot.

As illustrated in FIG. 9, at a time t1, a part of a vehicle CR3 (for example, a rear part of the vehicle CR3) passing through an intersection INTC1 is a blind spot from any of the cameras C1 to C4 installed at the intersection INTC1. The centers of the capturing view angles of the cameras C1 to C4 are directed to the center of the intersection INTC1, but the periphery approaching the intersection INTC1 is also set to be included in the capturing view angle. Nevertheless, since a vehicle CR3 traveling on a place not approaching the intersection INT·BR>B1 at the time t1, it is not possible to acquire a captured image of a blind spot of the vehicle CR3.

Meanwhile, although the rear part of the vehicle CR3 is the blind spot at the time of image capturing at the time t1, the rear part of the vehicle CR3, which is the same subject, can be captured by any of the cameras C1 to C4 installed at the intersection INTC1 at a time t2. Therefore, when generating the free viewpoint image of the vehicle CR3 at the time t1, the retrieval terminal 90 according to the third embodiment uses the captured image at the time (that is, the time t2) different from the time (that is, the time t1) at which the free viewpoint image of the same subject vehicle CR3 is generated. However, it is prerequisite that the shape of the vehicle CR3 is moving without being deformed at the times t1 and t2.

In FIG. 10, it is assumed at the occurrence intersection INTC1 of the traffic accident at the time of the occurrence of the traffic accident that the image has been captured every a predetermined time Δt by each camera installed at the intersection INTC1 (S21). The retrieval terminal 90 receives data of the captured image for a predetermined period before and after the occurrence of the traffic accident captured every a certain time Δt by the camera installed at the intersection INTC1 from the recording server 50 or the cloud server 70, and displays the received data on the output unit 94.

When the data of the image captured for the predetermined period before and after the occurrence of the traffic accident is displayed on the output unit 94, the retrieval terminal 90 accepts, by the input operation of the policeman, the designation of the subject (for example, the vehicle CR3) so as to generate a free viewpoint image in the captured image of the subject (for example, the vehicle CR3) at a point of time (time tk; time t1 in the example of FIG. 9) of occurrence of the traffic accident. Based on the captured images of the cameras installed at the intersection INTC1 at the designated time tk (the time t1 in the example of FIG. 9), the processor 92 of the processor 92 generates a three-dimensional shape model for generating the free viewpoint image of the subject (for example, the vehicle CR3) designated by such a designation (S22).

The processor 92 of the retrieval terminal 90 determines whether the size of the blind spot region, in which the free viewpoint image of the subject (for example, the vehicle CR3) is not allowed to be generated at the time tk (the time t1 in the example of FIG. 9), is equal to or larger than a certain value based on the three-dimensional shape model generated in step S22 (S23). When determining that the size of the blind spot region is smaller than the certain value (NO in S23), the processor 92 of the retrieval terminal 90 generates the free viewpoint image of the subject (for example, the vehicle CR3) at the time tk (the time t1 in the example of FIG. 9) (S24) and the processor 92 outputs the free viewpoint image generated in step S24 to the output unit 94 (S28).

On the other hand, when determining that the size of the blind spot region is equal to or larger than the certain value (YES in S23), the processor 92 of the retrieval terminal 90 estimates a moving direction of the subject (for example, the vehicle CR3) from the data of the captured image during a predetermined period of time before and after the time tk (the time t1 in the example of FIG. 9) (S25). In the example of FIG. 9, since the vehicle CR3 moves from a left side of the drawing to a right side of the drawing, the moving direction is a right direction. Based on the estimated moving direction, the retrieval terminal 90 selects a captured image at a time at which the blind spot region insufficient for generating the free viewpoint image is likely to be reflected (S25). In the example of FIG. 9, the rear part of the vehicle CR3 is the blind spot of the vehicle CR3 at the time t1, but the blind spot is reflected on the captured image at the time t2. Thus, the retrieval terminal 90 supplements the captured image of the blind spot insufficient for generating the free viewpoint image at the time t1 with the captured image at the time t2.

The processor 92 of the retrieval terminal 90 cuts out the subject (for example, the vehicle CR3) reflected on the captured image at the other time tn (≠time tk; the time t2 in the example of FIG. 9) selected in step S25 and extracts the subject (S26). The retrieval terminal 90 supplements the blind spot of the three-dimensional shape model generated in step S22 using the captured image of at least one camera at the time tn (the time t2 in the example of FIG. 9) selected in step S25, and the processor 92 generates the free viewpoint image of the subject (for example, the vehicle CR3) at the time tk (the time t1 in the example of FIG. 9) (S27). The processor 92 of the retrieval terminal 90 outputs the free viewpoint image generated in step S27 to the output unit 94 (S28). The display of the vehicle with the free viewpoint image may be used when the policeman sees the image on the scene not only after the end of the incident in FIG. 6 (see step Sc1) but also immediately after the occurrence of the incident.

As described above, according to the report creation assist system 100 of the third embodiment, the retrieval terminal 90 (an example of an image supplementing device) is communicably connected to the recording server 50 or the cloud server 70 that records the captured images of the individual cameras installed in the plurality of intersections in correlation with the camera information and the intersection information. The communication unit 93 of the retrieval terminal 90 receives the captured image transmitted from the recording server 50 or the cloud server 70, the captured image being taken for the predetermined period before and after the occurrence of the event by at least one camera corresponding to any one of the plurality of intersections. When the captured image for the predetermined period before and after the occurrence of the event is output to the output unit 94, the operation unit 91 (an example of an input unit) of the retrieval terminal 90 accepts the designation of the subject in the captured image. The processor 92 of the retrieval terminal 90 determines whether the free viewpoint image of the subject is generated at the time at which the subject is designated. As a result of the determination that the free viewpoint image of the subject can be allowed not to be generated, the processor 92 (an example of a supplementing unit) of the retrieval terminal 90 cuts out the captured image of the subject at the point of time different from the point of time at which the subject is designated, and extracts the cut image as a supplemental image to be used for the generation of the free viewpoint of the subject. The processor 92 (an example of a generation unit) of the retrieval terminal 90 generates the free viewpoint image of the subject, using the captured images of the plurality of cameras at the point of time at which the subject is designated and the extracted supplemental image.

Thus, when the policeman creates the report with the end of the incident or accident that has occurred at the edge of the intersection where many people and vehicle come and go, the retrieval terminal 90 can supplement the image of the blind spot, which cannot be reflected on the captured image of the camera installed at the intersection with the captured image of the same subject forming the blind spot after a certain time and an appropriate image capable of being posted on the report is acquired.

In addition, the processor 92 (an example of the supplementing unit) of the retrieval terminal 90 cuts out the captured images of the subject at the plurality of points of time different from the point of time at which the subject is designated, and extracts the cut images as supplemental images. Thus, even when the captured images at a plurality of capturing timings are necessary for all the parts of the subject, which are blind spots, to generate the free viewpoint image at the point of time at which the subject is designated, for example, the retrieval terminal 90 can generate the free viewpoint image of the subject (for example, the vehicle) designated by the policeman.

Further, the subject is a vehicle involved in the occurrence of the event such as an incident or accident. Thus, the retrieval terminal 90 can generate the free viewpoint image at the time of the occurrence of the event of the vehicle having a high possibility of causing such an event and the free viewpoint image is posted on the report created by the policeman, so that the quality of the report can be improved.

Background to Fourth Embodiment

In JP-A-2007-174016, the camera image information captured by the plurality of cameras is displayed on the display device in the terminal device mounted on the vehicle. Therefore, the user (for example, driver) can check real-time captured images at the locations where the respective cameras are disposed. In JP-A-2007-174016, however, a technique is not considered which extracts an image of a viewpoint (for example, an angle at which a vehicle causing an incident or accident can be more clearly identified) conforming to the intent of the policeman who creates a report, as an image to be posted on the report created with the end of the incident or accident that has occurred at the intersection at which many people or vehicles come and go. For this reason, even in the case of using the technique disclosed in JP-A-2007-174016 when the policeman creates a report with the end of the above-described accident or incident, the captured image, which is simply used as it is, of at least one camera installed at the intersection is not used as an image suitable for the situation at the time of the occurrence of the incident or accident, and thus an appropriate image is hardly posted on the report.

Therefore, in view of the above-described circumstances, an example of an image selecting device and an image selecting method is described in the following fourth embodiment in which, when the policeman creates a report with the end of the an incident or accident that has occurred at the intersection at which many people or vehicles come and go, an image of a subject more clearly showing the situation at the time of occurrence of an incident or accident is selected and an appropriate image capable of being posted on a report is presented to a policeman.

Fourth Embodiment

Since a configuration of a report creation assist system according to the fourth embodiment is the same as that of the report creation assist system 100 according to the first embodiment, the same components are represented by the same reference numerals, the detailed descriptions thereof are simplified or omitted, and the following descriptions will be given on different components.

Figure 11:
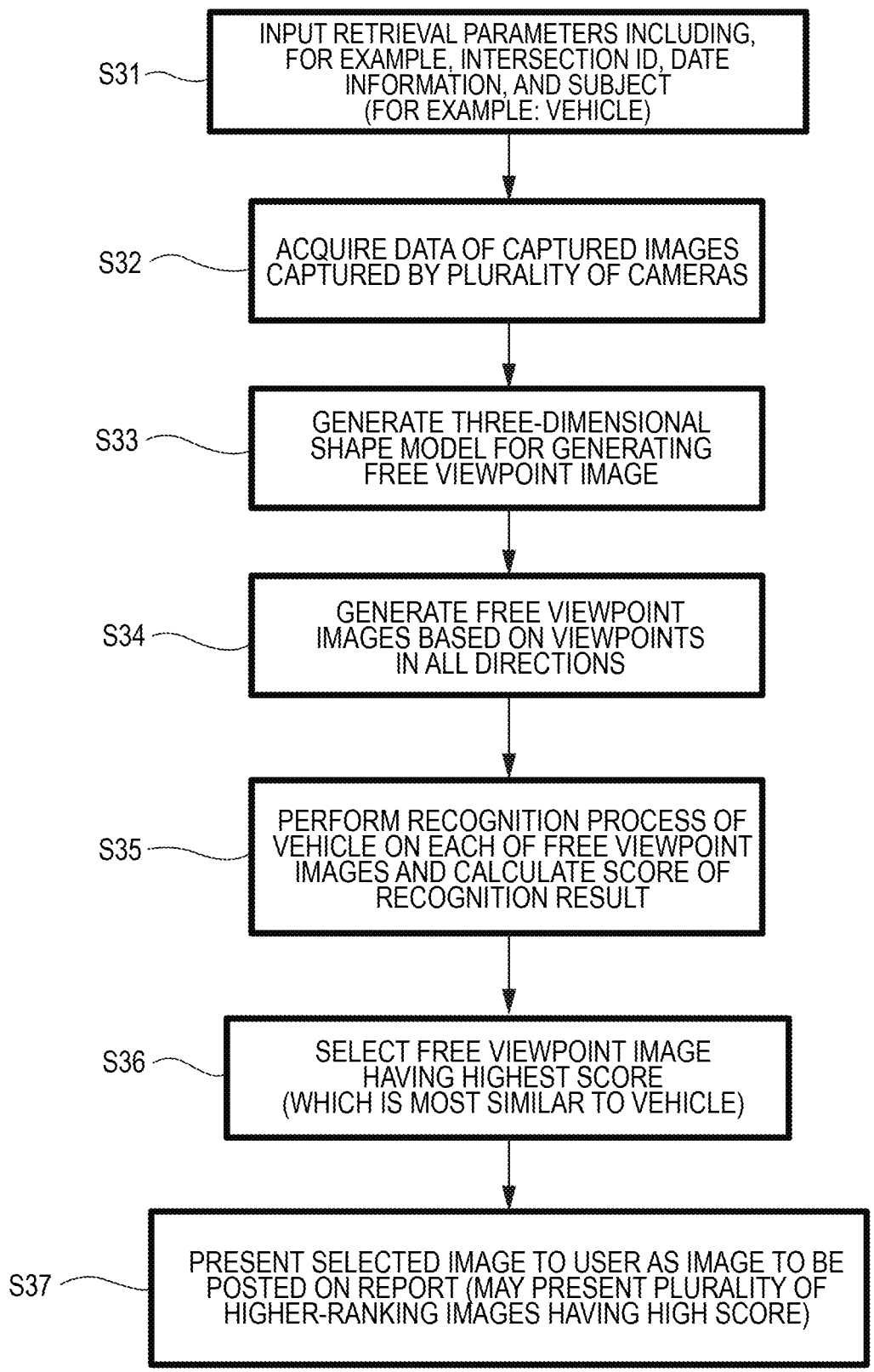
FIG. 11 is a flowchart illustrating an example of an operation procedure of best-shot presentation processing of a free viewpoint image in the retrieval terminal according to a fourth embodiment.

FIG. 11 is a flowchart illustrating an example of an operation procedure of best-shot presentation processing of a free viewpoint image in the retrieval terminal 90 according to the fourth embodiment. The best-shot presentation processing illustrated in FIG. 11 is executed in step Sc7 of the report creation scenario illustrated in FIG. 6.

In FIG. 11, retrieval parameters is input to the retrieval terminal 90 by an input operation of a policeman who creates a report, the retrieval parameters including identification information (intersection ID) of an intersection at which an event such as an incident or accident to be posted on the report has occurred, date information, a subject (for example, a vehicle), and the like (S31).

The retrieval terminal 90 transmits a request (that is, an image retrieval key) of captured images of a plurality of cameras corresponding to the intersection ID satisfying the retrieval parameter input in step S31 to the recording server 50 or the cloud server 70. The retrieval terminal 90 receives the data of the plurality of captured images transmitted from the recording server 50 or the cloud server 70, based on the image retrieval key (S32), and displays the data of the plurality of captured images on the output unit 94.

In order to generate a free viewpoint image of a subject (for example, a vehicle causing the incident or accident), about which the policeman is concerned, among the plurality of captured images displayed on the output unit 94, the retrieval terminal 90 accepts the designation of the subject to be generated by the input operation of the policeman. The retrieval terminal 90 generates a three-dimensional shape model for generating the free viewpoint image of the subject designated according to the designation (S33).

Based on the three-dimensional shape model of the subject (for example, the vehicle causing the incident or accident) generated in step S33, the retrieval terminal 90 generates free viewpoint images from viewpoints in all directions (S34). The retrieval terminal 90 performs a recognition process of the subject (for example, the vehicle) on each of the free viewpoint images generated from the viewpoints in all directions in step S34, and calculates a score indicating recognition accuracy of the recognition process (S35). The recognition process in step S35 may be, any one of, for example, pattern matching, machine learning, and deep learning in which a vehicle is a recognition target, or may be realized by another recognition method.

The retrieval terminal 90 selects the free viewpoint image having the highest score (in other words, which is most similar to the vehicle) calculated in step S35 (S36). The retrieval terminal 90 displays the free viewpoint image selected in step S36 on the output unit 94 so as to present it to a user as an image to be posted on the incident report (S37). In step S37, the retrieval terminal 90 may display a plurality of higher-ranking free viewpoint images having a high score calculated in step S35. Thus, the policeman can select a free viewpoint image conforming to his/her intent from the plurality of free viewpoint images as an image capable of being posted on the report, so that the quality of the report can be improved.

As described above, according to the report creation assist system 100 of the fourth embodiment, the retrieval terminal 90 (an example of an image selecting device) is communicably connected to the recording server 50 or the cloud server 70 that records the captured images of the individual cameras installed in the plurality of intersections in correlation with the camera information and the intersection information. The communication unit 93 of the retrieval terminal 90 receives the captured image transmitted from the recording server 50 or the cloud server 70, the captured image being taken at the time of the occurrence of the event by at least one camera corresponding to any one of the plurality of intersections. When the captured image at the time of the occurrence of the event is being output to the output unit 94, the operation unit 91 (an example of an input unit) of the retrieval terminal 90 accepts the designation of the subject in the captured image. The processor 92 (an example of an image generation unit) of the retrieval terminal 90 generates the free viewpoint images from the viewpoints in plural directions of the subject at the point of time at which the subject is designated, using the captured images of the plurality of cameras at the point of time at which the subject is designated. The processor 92 (an example of a recognition unit) of the retrieval terminal 90 performs the recognition process on each of the generated free viewpoint images. The processor 92 (an example of a presentation unit) of the retrieval terminal 90 displays the free viewpoint having the highest score indicating the recognition accuracy of the recognition process on the output unit 94 to present it to the user.

Therefore, when the policeman creates a report with the end of the an incident or accident that has occurred at the intersection at which many people or vehicles come and go, the retrieval terminal 90 can select an image of a subject more clearly showing the situation at the time of occurrence of an incident or accident and can present an appropriate image capable of being posted on the report to a policeman.

In addition, the processor 92 (an example of a presentation unit) of the retrieval terminal 90 outputs the plurality of higher-ranking free viewpoint images having a high score to the output unit 94 and presents it to the policeman. Thus, the policeman can select a free viewpoint image conforming to his/her intent from the plurality of free viewpoint images as an image capable of being posted on the report, so that the quality of the report can be improved.

Further, the subject of the free viewpoint image is a vehicle involved in the occurrence of the event such as an incident or accident. Thus, the retrieval terminal 90 can generate the free viewpoint image in which features of a vehicle causing such an event such as an incident or accident (in other words, a vehicle on which a criminal is riding) is more clearly understandable and can present the free viewpoint image to the policeman.

Background to Fifth Embodiment

In JP-A-2007-174016, the camera image information captured by the plurality of cameras is displayed on the display device in the terminal device mounted on the vehicle. Therefore, the user (for example, driver) can check real-time captured images at the locations where the respective cameras are disposed. In JP-A-2007-174016, however, a technique is not considered which generates an evidence image requested to be submitted for interrogation of a prosecutor or a judge at a court with respect to the incident or accident that has occurred at an intersection at which many people or vehicles come and go. In particular, a free viewpoint image conforming to the intent of a policeman can be posted on a report to be created by the policeman with the end of the incident or accident, but the free viewpoint image is a synthetic image and does not have evidence, so that the free viewpoint image is not an evidence image suitable for the submission request from the prosecutor or the judge at the court. For this reason, even when the technique disclosed in JP-A-2007-174016 is used to generate an evidence image that is requested to be submitted during the interrogation of the prosecutor or the judge at the court after the end of the end of the above-described accident or incident, the policeman needs to select the evidence image required to be submitted by the prosecutor or the judge at the court from the enormous number of captured images of the cameras installed at the intersection at which the incident or accident has occurred, so that a lot of time and labor are necessary for selection of the evidence image and the work burden on the policeman is hardly reduced.

Therefore, in view of the above-described circumstances, an example of an image generating device and an image generating method is described in the following fifth embodiment in which, when a free viewpoint image to be posted on the report created by the policeman with the end of the incident or accident that has occurred at the intersection, at which many people or vehicles come and go, is generated, metadata of a captured image of a camera which is a source of the free viewpoint image is recorded and the evidence image requested to be submitted is simply generated, thereby reducing the work burden on the policeman.

Fifth Embodiment

Since a configuration of a report creation assist system according to the fifth embodiment is the same as that of the report creation assist system 100 according to the first embodiment, the same components are represented by the same reference numerals, the detailed descriptions thereof are simplified or omitted, and the following descriptions will be given on different components.

Figure 12:
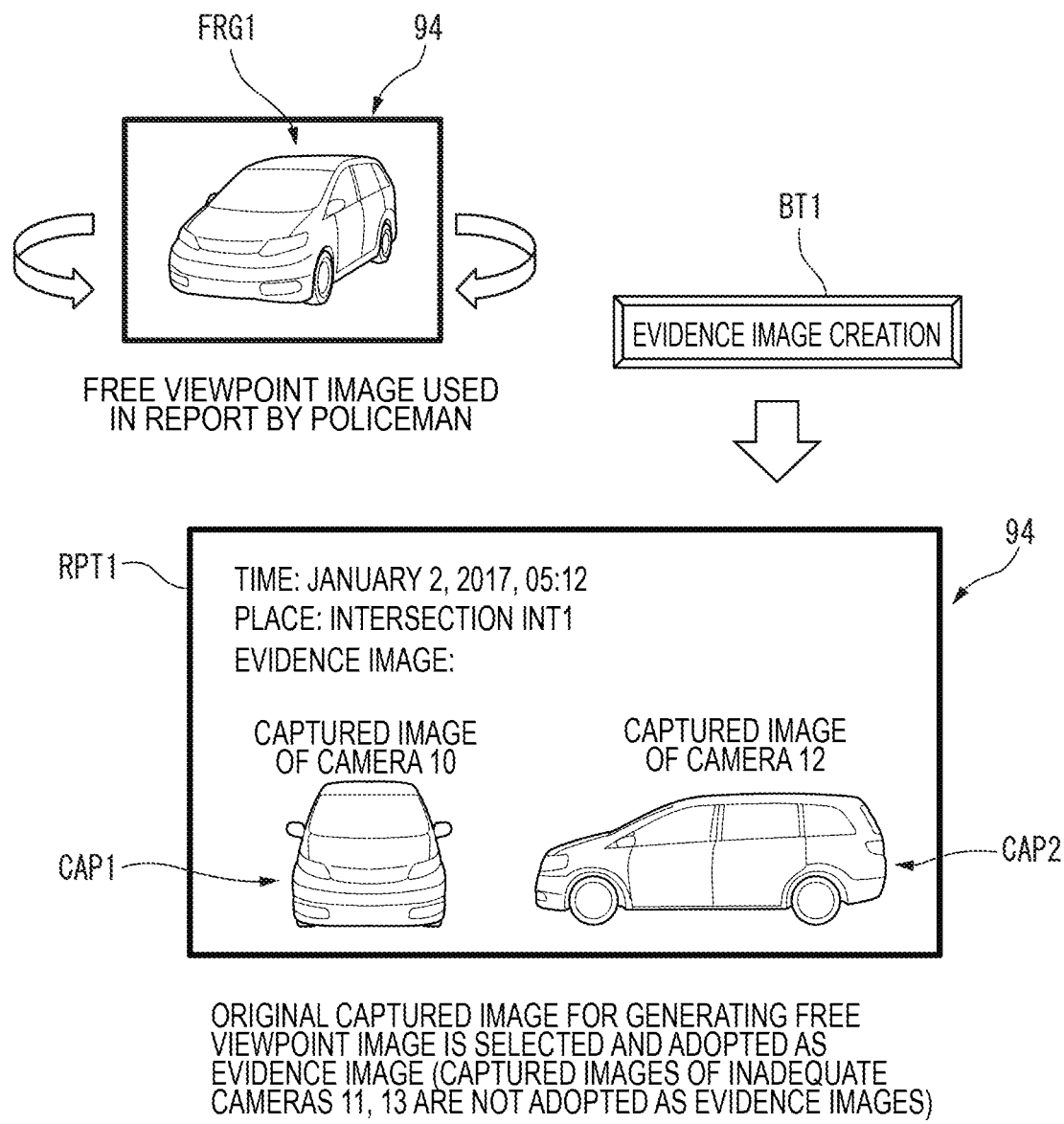
FIG. 12 is an explanatory diagram of an operation outline concerning the generation of the evidence image displayed on the retrieval terminal according to a fifth embodiment.
Figure 13A:
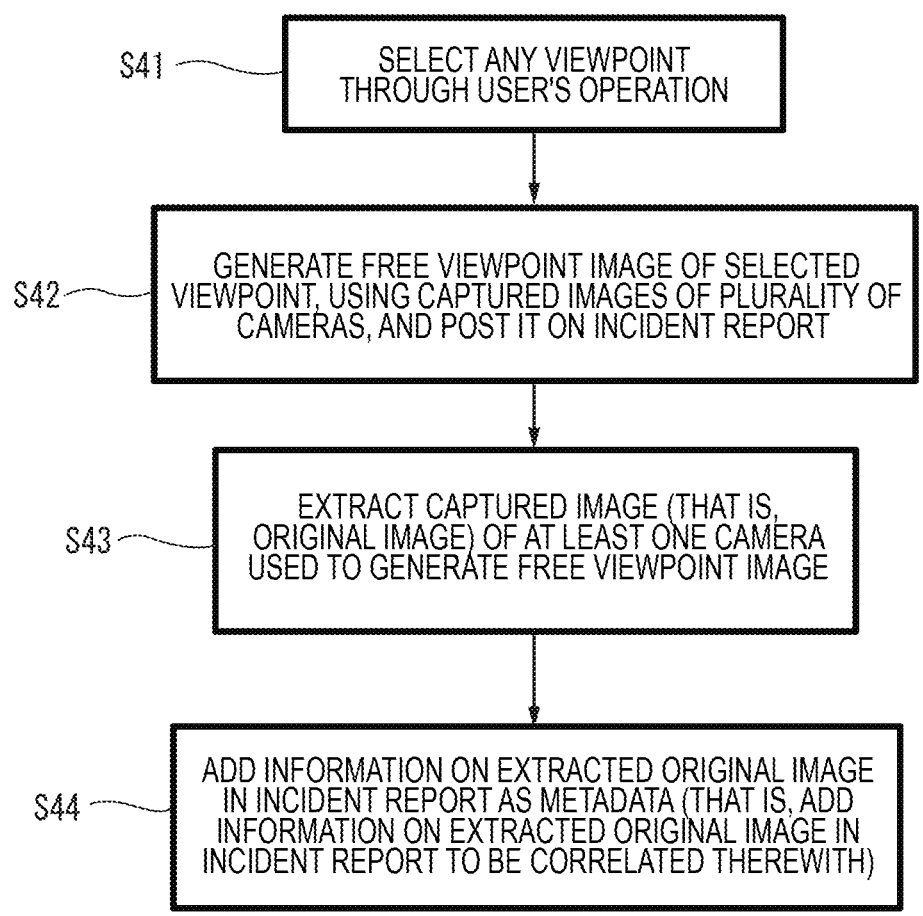
FIG. 13A is a flowchart illustrating an example of an operation procedure of report generation processing in the retrieval terminal according to the fifth embodiment.
Figure 13B:
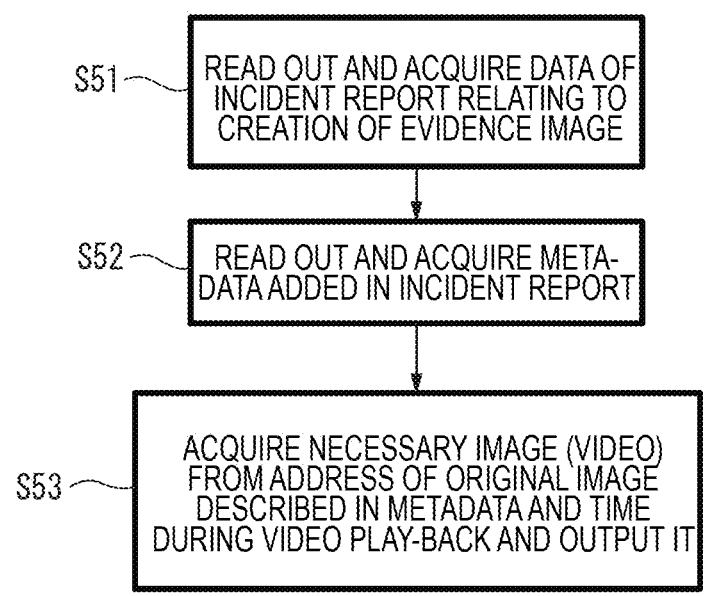
FIG. 13B is a flowchart illustrating an example of an operation procedure of evidence image generation processing in the retrieval terminal according to the fifth embodiment.

FIG. 12 is an explanatory diagram of an operation outline concerning the generation of the evidence image displayed on the retrieval terminal 90 according to the fifth embodiment. FIG. 13A is a flowchart illustrating an example of an operation procedure of report generation processing in the retrieval terminal 90 according to the fifth embodiment. FIG. 13B is a flowchart illustrating an example of an operation procedure of evidence image generation processing in the retrieval terminal 90 according to the fifth embodiment. The report generation processing illustrated in FIG. 13A is executed in step Sc9 of the report creation scenario illustrated in FIG. 6. The evidence image generation processing illustrated in FIG. 13B is executed in step Sc16 of the report creation scenario illustrated in FIG. 6.

As illustrated in FIG. 12, it is assumed that a free viewpoint image FRG1 used to be posted on the report by the policeman is displayed on the output unit 94 of the retrieval terminal 90. Since the free viewpoint image FRG1 has good visibility of the subject, it is considered to be suitable for being posted on the report created by the policeman. However, since the free viewpoint image FRG1 itself is a synthetic image obtained using captured images of a plurality of cameras at a certain time, it can hardly be the evidence image requested to be submitted by the prosecutor or the judge at the court, and can hardly be used.

Therefore, when generating the free viewpoint image FRG1, the retrieval terminal 90 according to the embodiment records information (hereinafter, referred to as "original image information") related to the captured images of the cameras used to generate the free viewpoint image FRG1 in the storage unit 96 according to the operation of the policeman in correlation with the free viewpoint image FRG1. In the example of FIG. 12, the captured images of the cameras using for generating the free viewpoint image FRG1 are a captured image CAP1 (that is, a front image of a vehicle as the subject of the free viewpoint image FRG1) of the camera 10 and a captured image CAP2 (that is, a left-side image of the vehicle as the subject of the free viewpoint image FRG1) of the camera 12. Regarding the description of FIG. 12, the cameras 10 to 13 are exemplified using the installation layout of FIG. 2A.

When the evidence image is requested to be submitted from the prosecutor or the judge at the court, the retrieval terminal 90 refers to the original image information recorded in the storage unit 96 at the time of the generation of the free viewpoint image FRG1 when an evidence image creation button BT1 is pressed by the operation of an evidence video creator and generates the captured images CAP1 and CAP2 (that is, evidence images) used to generate the free viewpoint image FRG1. The retrieval terminal 90 generates an evidence image screen RPT1 including date and time at which the incident or accident has occurred, a place, and an evidence image and displays it on the output unit 94. The captured images of the cameras 11 and 13 are not adopted as evidence images.

As a premise of the description of FIG. 13A, the incident information has already been input as illustrated in FIG. 6. The incident information includes, for example, information on the incident number (or incident type), information on the date and place of occurrence of the incident, and information of a traveling direction of the vehicle involved in the occurrence of the incident at the time of the occurrence of the incident (for example, the vehicle causing the incident).

In FIG. 13A, a viewpoint is selected by a user's operation (that is, an operation of the policeman who creates the report) using the retrieval terminal 90 (S41), the viewpoint being a target for generating the free viewpoint image of the subject (for example, the vehicle causing the incident) to be posted on the report. The retrieval terminal 90 generates the free viewpoint image of the viewpoint selected in step S41, using the data of the captured images of the plurality of cameras at the time of the occurrence of the incident (S42). Since the generated free viewpoint image is in conformity with the intent of the policeman, it is posted on the report created by the policeman.

When generating the free viewpoint image (for example, the free viewpoint image FRG1) in step S42, the retrieval terminal 90 extracts the information (original image information) related to the captured image of the camera used to generate the free viewpoint image FRG1 according to the operation of the policeman (S43). The retrieval terminal 90 records the original image information extracted in step S43 in the storage unit 96 in correlation with the free viewpoint image FRG1 (S44). In step S44, the retrieval terminal 90 may add the original image information, as metadata of the free viewpoint image, in the report data. As an adding method, the retrieval terminal 90 uses, as original image information, a QR code (registered trademark) including, for example, an address at which a storage place of data of the original image is described and information on a capturing time of the camera and displays the QR code on the periphery of the free viewpoint image. Further, the retrieval terminal 90 may add the original image information in the free viewpoint image using a known image watermarking technique.

As a premise of the description of FIG. 13B, the data of the incident report, on which the free viewpoint image created in FIG. 13A is posted, is recorded in advance in the storage unit 96 of the retrieval terminal 90.

In FIG. 13B, the retrieval terminal 90 reads out and acquires the data of the incident report relating to the creation of the evidence image from the storage unit 96 by an input operation of the evidence video creator (S51). The retrieval terminal 90 reads out and acquires the metadata added in the data of the report acquired in step S51 (S52).

From the information of the address and the video creation time (in other words, the capturing time of the camera at the intersection at which the incident has occurred) described in the metadata acquired in step S52, the retrieval terminal 90 acquires a necessary captured image or captured video and displays it on the output unit 94 (S53, see the evidence image screen RPT1 in FIG. 12). Thus, it is possible to considerably reduce the time and labor of the evidence video creator who creates the evidence image or the evidence video requested to be submitted by the prosecutor or the judge at the court and to simplify the creation of DVD to be submitted.

As described above, according to the report creation assist system 100 of the fourth embodiment, the retrieval terminal 90 (an example of an image generating device) is communicably connected to the recording server 50 or the cloud server 70 that records the captured images of the individual cameras installed in the plurality of intersections in correlation with the camera information and the intersection information. The communication unit 93 of the retrieval terminal 90 receives the captured image transmitted from the recording server 50 or the cloud server 70, the captured image being taken at the time of the occurrence of the event by at least one camera corresponding to any one of the plurality of intersections. When the captured image at the time of the occurrence of the event is being output to the output unit 94, the operation unit 91 (an example of an input unit) of the retrieval terminal 90 accepts the designation of the subject in the captured image and the viewpoint for the subject. The processor 92 (an example of an image generation unit) of the retrieval terminal 90 generates the free viewpoint image of the subject along the viewpoint, using the captured images of the plurality of cameras at the point of time at which the subject and the viewpoint for the subject are designated. The processor 92 (an example of a metadata management unit) of the retrieval terminal 90 records the metadata of the captured images of the plurality of cameras used to generate the free viewpoint image of the subject in the storage unit 96 in correlation with the free viewpoint image of the subject.

Therefore, when the retrieval terminal 90 generates the free viewpoint image to be posted on the report created by the policeman with the end of the an incident or accident that has occurred at the intersection at which many people or vehicles come and go, it is possible to record the metadata of the captured image of the original camera of the free viewpoint image, to simplify the generation of the evidence image requested to be submitted, and to reduce the work burden on the policeman.

Further, the processor 92 (an example of a metadata management unit) of the retrieval terminal 90 reads out the metadata corresponding to the free viewpoint image of the subject from the storage unit 96 in response to the generation instruction of the evidence image. The processor 92 (an example of an image generation unit) of the retrieval terminal 90 reads out the captured images of the plurality of cameras used to generate the free viewpoint image of the subject from the storage unit 96, based on the read metadata, and generates the evidence image. Thus, it is possible to considerably reduce the time and labor of the evidence video creator who creates the evidence image or the evidence video requested to be submitted by the prosecutor or the judge at the court and to simplify the creation of DVD to be submitted.

In addition, the processor 92 (an example of an output control unit) of the retrieval terminal 90 outputs (for example, displays) the generated evidence image to the output unit 94 together with the occurrence date and time and occurrence place of the event. Thus, since the evidence video creator can intuitively and visually confirm the content of the evidence image generated by the retrieval terminal 90 by collation with the outline of the incident, the consistency of the content can be quickly discriminated.

Although the various embodiments have been described with reference to the drawings, the present disclosure is not limited to the embodiments. It is obvious to those skilled in the art that various changes and modifications can be made within the category described in claims, and belong to the scope of the present disclosure. Moreover, the components in the various embodiments may be arbitrarily combined without departing the scope of the present disclosure.

The disclosure is useful as an image retrieval assist device and an image retrieval assist method which, when a policeman creates a report with the end of an incident or accident that has occurred at an intersection at which many people or vehicles come and go, assists efficiently retrieval of an image suitable for indicating the situation at the time of the occurrence of the incident or accident and reduces the work burden on the policeman.

What is claimed is:

1. An image retrieval assist device that is communicably connected to an investigation assist device for recording captured images of cameras installed at a plurality of intersections, respectively, in association with camera information and intersection information, the image retrieval assist device comprising:
   a processor;
   a communication unit; and
   a storage that stores an extraction condition of an image for each type of event, of a plurality of types of events, that has occurred at the intersection, the image indicating a situation at a time of occurrence of the event,
   wherein the processor receives an input of event information including: the type of event and the time of occurrence of the event;
   wherein the processor determines, based on the input of event information including: the type of event and the time of occurrence of the event, the extraction condition for the input, the extraction condition specifying a duration of image extraction and camera or intersection identification, and wherein the processor generates an image retrieval key including the extraction condition for the input; and
   wherein the communication unit transmits the generated image retrieval key to the investigation assist device.

2. The image retrieval assist device according to claim 1, wherein the processor outputs a captured image of a camera satisfying the image retrieval key to an output device.

3. The image retrieval assist device according to claim 1, wherein the event information includes at least information on a traveling direction at the time of occurrence of an event of a vehicle involved in the occurrence of the event and information on an intersection at which the event has occurred, and
   wherein the processor generates, as the image retrieval key, a condition for extracting a captured image of a camera that captures the vehicle running in the traveling direction in front view for an X (X: a default value) minute before and after the occurrence of the event.

4. The image retrieval assist device according to claim 1, wherein the event information includes at least information on a traveling direction at the time of occurrence of an event of a vehicle involved in the occurrence of the event and information on an intersection at which the event has occurred, and
   wherein the processor generates, as the image retrieval key, a condition for extracting captured images of all cameras that capture the vehicle running in the traveling direction every a W (W: a default value) minute from a Y (Y: a default value) minute before the occurrence of the event until Z (Z: a default value) minutes after the occurrence of the event, the captured images corresponding to the information of the intersection.

5. The image retrieval assist device according to claim 1, wherein the event information includes at least information on a traveling direction at the time of occurrence of an event of a vehicle involved in the occurrence of the event and information on an intersection at which the event has occurred, and
   wherein the processor generates, as the image retrieval key, a condition for extracting a captured image of a camera that captures the vehicle running in the traveling direction in front view, at the time of the occurrence of the event and at the time of passing through an immediately preceding intersection.

6. An image retrieval assist method using an image retrieval assist device that is communicably connected to an investigation assist device for recording captured images of individual cameras installed at a plurality of intersections in association with camera information and intersection information, the image retrieval assist method comprising:
   storing an extraction condition of an image in a storage for each type of event, of a plurality of types of events, that has occurred at the intersection, the image indicating a situation at a time of occurrence of the event;
   receiving an input of event information including: the type of event and the time of occurrence of the event;
   determining, based on the input of event information including: the type of event and the time of occurrence of the event, the extraction condition for the input, the extraction condition specifying a duration of image extraction and camera or intersection identification;
   generating an image retrieval key including the extraction condition for the input; and
   transmitting the generated image retrieval key to the investigation assist device.

7. The image retrieval assist method according to claim 6, wherein the input of event information includes a date of occurrence of the event.

8. The image retrieval assist method according to claim 7, comprising:
   determining, based on the input of event information including the date of occurrence of the event, the extraction condition.

9. The image retrieval assist method according to claim 6, wherein the extraction condition includes a camera field of view.

10. The image retrieval assist method according to claim 9, comprising:
    determining the camera field of view based on the type of event included in the input of event information.

11. The image retrieval assist method according to claim 9, wherein the camera field of view and the duration of image extraction are fixed for the type of event.

12. The image retrieval assist device according to claim 1, wherein the input of event information includes a date of occurrence of the event.

13. The image retrieval assist device according to claim 12, wherein
    the processor determines, based on the input of event information including the date of occurrence of the event, the extraction condition.

14. The image retrieval assist device according to claim 1, wherein the extraction condition includes a camera field of view.

15. The image retrieval assist device according to claim 14, wherein the processor determines the camera field of view based on the type of event included in the input of event information.

16. The image retrieval assist device according to claim 14, wherein the camera field of view and the duration of image extraction are fixed for the type of event.

* * * * *